(12) United States Patent
Chen-Wright et al.

(10) Patent No.: US 7,523,127 B2
(45) Date of Patent: Apr. 21, 2009

(54) SYSTEM AND METHOD FOR A HIERARCHICAL DATABASE MANAGEMENT SYSTEM FOR EDUCATIONAL TRAINING AND COMPETENCY TESTING SIMULATIONS

(75) Inventors: Kathy Chen-Wright, Morgan, UT (US); Nathan H. Garner, Provo, UT (US); Neil M. Maxwell, Orem, UT (US)

(73) Assignee: TestOut Corporation, Pleasant Grove, UT (US)

( * ) Notice: Subject to any disclaimer, the term of this patent is extended or adjusted under 35 U.S.C. 154(b) by 146 days.

(21) Appl. No.: 10/342,967

(22) Filed: Jan. 14, 2003

(65) Prior Publication Data

US 2003/0154204 A1 Aug. 14, 2003

Related U.S. Application Data

(60) Provisional application No. 60/348,774, filed on Jan. 14, 2002.

(51) Int. Cl.
*G06F 17/30* (2006.01)
(52) U.S. Cl. .......................................... 707/102; 706/11
(58) Field of Classification Search ........................ None
See application file for complete search history.

(56) References Cited

U.S. PATENT DOCUMENTS

| 5,313,620 | A | | 5/1994 | Cohen et al. | |
|---|---|---|---|---|---|
| 5,726,979 | A | * | 3/1998 | Henderson et al. | 370/254 |
| H1728 | H | | 5/1998 | Kelso et al. | |
| 5,823,872 | A | | 10/1998 | Prather et al. | |
| 5,907,696 | A | | 5/1999 | Stilwell et al. | |
| 5,958,012 | A | | 9/1999 | Battat et al. | |
| 6,064,998 | A | | 5/2000 | Zabloudil et al. | |
| 6,151,567 | A | * | 11/2000 | Ames et al. | 703/13 |
| 6,259,679 | B1 | * | 7/2001 | Henderson et al. | 370/254 |
| 6,360,228 | B1 | * | 3/2002 | Sundara et al. | 707/102 |
| 6,371,765 | B1 | | 4/2002 | Wall et al. | |
| 6,393,386 | B1 | * | 5/2002 | Zager et al. | 703/25 |
| 6,434,517 | B1 | * | 8/2002 | Le | 703/21 |

(Continued)

FOREIGN PATENT DOCUMENTS

JP 402202641 8/1990

(Continued)

OTHER PUBLICATIONS

RouterSim Interactive Simulation-Based Training.

(Continued)

*Primary Examiner*—Debbie M Le
(74) *Attorney, Agent, or Firm*—Thorpe North & Western LLP

(57) ABSTRACT

A hierarchical database system and method is provided for providing data to populate a simulated computer environment. The data is organized according to a data schema that defines different types of records and record relationships in the database. The system includes a database which includes, records defining simulated components in a simulated computer environment and links which define hierarchical relationships between the records. Database code is also included. The database code is programmed to add, delete, modify, and retrieve records and links of the database. The database code is also capable of being integrated with a software module for maintaining and generating the simulated computer environment. A method for automatically populating records of the database from configuration information for an actual computer system is also provided.

14 Claims, 11 Drawing Sheets

U.S. PATENT DOCUMENTS

| | | | |
|---|---|---|---|
| 6,611,498 B1* | 8/2003 | Baker et al. | 370/252 |
| 6,651,191 B1* | 11/2003 | Vacante et al. | 714/47 |
| 6,687,748 B1* | 2/2004 | Zhang et al. | 709/223 |
| 6,763,326 B1* | 7/2004 | Watkins et al. | 703/21 |
| 6,766,311 B1 | 7/2004 | Wall et al. | |
| 6,768,975 B1* | 7/2004 | Gill et al. | 703/13 |
| 6,772,107 B1* | 8/2004 | La Cascia et al. | 703/21 |
| 6,775,824 B1* | 8/2004 | Osborne et al. | 717/125 |
| 6,931,366 B2 | 8/2005 | Wang et al. | |
| 6,978,244 B2 | 12/2005 | Rovinelli et al. | |
| 6,985,898 B1* | 1/2006 | Ripley et al. | 707/5 |
| 7,006,963 B1 | 2/2006 | Maurer | |
| 7,016,880 B1* | 3/2006 | Adams et al. | 706/11 |
| 7,016,949 B1 | 3/2006 | Tagawa | |
| 7,076,713 B1* | 7/2006 | Hess | 714/741 |
| 7,143,021 B1* | 11/2006 | McGaughy et al. | 703/14 |
| 2001/0044851 A1 | 11/2001 | Rothman | |
| 2001/0049594 A1 | 12/2001 | Klevans | |
| 2001/0051862 A1 | 12/2001 | Ishibashi et al. | |
| 2002/0046209 A1* | 4/2002 | De Bellis | 707/10 |
| 2002/0055853 A1 | 5/2002 | Macleod Beck et al. | |
| 2002/0059054 A1 | 5/2002 | Bade et al. | |
| 2002/0059376 A1 | 5/2002 | Schwartz | |
| 2002/0091726 A1 | 7/2002 | Macleod Beck et al. | |
| 2002/0101824 A1 | 8/2002 | Zuednab | |
| 2002/0106622 A1 | 8/2002 | Osborne et al. | |
| 2002/0130834 A1 | 9/2002 | Madarasz et al. | |
| 2002/0138847 A1 | 9/2002 | Abrams et al. | |
| 2002/0192623 A1 | 12/2002 | Sather et al. | |
| 2003/0005171 A1 | 1/2003 | Schaeffer | |
| 2003/0009742 A1 | 1/2003 | Bass et al. | |
| 2003/0061070 A1 | 3/2003 | Kelly et al. | |
| 2003/0084015 A1 | 5/2003 | Beams et al. | |
| 2003/0091970 A1 | 5/2003 | Fast et al. | |
| 2003/0112800 A1 | 6/2003 | Grech et al. | |
| 2003/0137930 A1 | 7/2003 | Futernik | |
| 2003/0212908 A1* | 11/2003 | Piesco | 713/201 |

OTHER PUBLICATIONS

Boson Router Simulator.

Certification Magazine, CertMag.com Learning Tools: Real, (Almost) Live Learning, pp. 1-4.

Duncombe, "Network management training for tactical systems" IEEE 1997.

Montane et al "specialized certification programs in computer science" ACM 2001.

Yamamoto et al., "An experimental study on distributed virtual environment for integrated training systme on machine maintenance", IEEE 1999.

Papa et al., "Broadband cellular radio telelcommunication technologies in distance learning: A human factors field", ACM 2001.

University System of Georgia. Rock Eagle 1999 Proceedings. University Systme of Georgia, 1999, 01-20. Retrieved from the Internet: <URL: http://www.usg.edu/oiit/re/re99/proceedings/index.html>.

Fleck, B. et al. An Evaluation of Electronic Testing Programs. University Systemof Georgia, 1999 20. Retrieved from the Internet: <URL: http://www.usg.edu/oiit/re/re99/proceedings/EEofTP/ EEofTP . . . .

Fleck, B. et al. Figure 1 (an Evaluation of Electronic Testing Programs). University System of Georgia on Jan. 20, 2006. Retrieved from the Internet: <URL: http://www.usg.edu/otti/re/re99/proceedings/EEof TP . . . .

* cited by examiner

SYSTEM AND METHOD FOR A HIERARCHICAL DATABASE MANAGEMENT SYSTEM FOR EDUCATIONAL TRAINING AND COMPETENCY TESTING SIMULATIONS

Priority is claimed in U.S. provisional patent application No. 60/348,774 filed on Jan. 14, 2002.

FIELD OF THE INVENTION

The present invention relates generally to the field of computer simulators.

BACKGROUND

Computers and information technology may be quite complex. From the software and middleware to the hardware and connections for communicating between machines, the technologies such as hardware, protocols, languages, software packages, and software standards involved is large and changes rapidly. Accordingly, companies, governments, associations and other organizations rely on proficient programmers, network administrators, database administrators, and other IT (Information Technology) professionals to keep their computer systems functioning properly and efficiently.

To become and remain employable, these IT professionals must be able to keep up and prove they can provide the services the employer seeks, often before being offered an IT employment position. Due to the high costs and high risks of using unskilled employees, employers are often unwilling to allow employees to learn the necessary skills on the job. In addition, universities and colleges do not teach all of the specific programming languages, hardware devices, or protocols used in the industry. Instead, using a select few, they focus on theory and principles common across the technologies.

Thus, to provide the credentials demanded by employers, the IT industry uses certification exams, particularly in the software industry. This effort is often led by vendors of the different technologies. The certification asserts that the vendor considers the certificate holder competent to use and maintain the IT technology being certified. Novell®, Microsoft® and others offer certification exams such as CNE (Certified NetWare Engineer), MCP (Microsoft Certified Professional), MCSE (Microsoft Certified Systems Engineer), and others.

However, conventional certification exams which use multiple choice and fill-in-the-blank questions are limited in their ability to measure behavioral skills. Some examinees may simply be good at memorizing rules and appropriate answers but lack the skills needed to perform "real world" tasks. Alternatively, the examinees may prepare for the exam by storing the answers in short term memory. Once the exam is over and the examinee has passed, the facts are quickly forgotten.

Essentially, the examinee lacks the kind of knowledge which is best obtained through the experience of applying the concepts and principles in real life situations or in a simulated environment. As competition has increased in the IT field, the certification exams have begun to focus greater proportions of their exams on testing an examinee's knowledge and skill in relation to an IT system rather than their ability to retain and recall technical information. This means the exams are setting objectives for the examinees which conventional test questions fail to adequately meet or measure.

For example, rather than require that an examinee know how to configure a network card. The certification exams are requiring that the examinee demonstrate an ability to configure the network card. This kind of objective is best assessed using a simulation or an actual IT environment.

The certification exams of today are designed to test an examinee's competence in using the particular technology, software, administration tool, or the like. These are the skills the employers want to know an applicant possesses. Crafting an exam question to test an examinee's ability to use the technology is very difficult without conducting a one-on-one assessment much like an actual driving test with a DMV official to receive a driver's license. Generally, due to the number of exams given and the number of examinees, one-on-one assessments are impractical.

To address these limitations, interactive exam questions have been developed which are directed toward an examinee's behavior. The examinee must do something to demonstrate that they could perform a specific task in an actual system, if required to do so. These interactive exam questions provide some realism when compared against standard exam questions. For example, one or more screen shots of a tool, configuration window, or other administrative context may be displayed to provide context for the question. The user is then asked to identify which parameter is set incorrectly. The user may identify the parameter by dragging and dropping a correct parameter setting to an answer box.

Alternatively, a conventional simulation may be used. Conventional simulations include a multi-media presentation of images and user interface controls which allow very limited interaction between the user and the simulation. These simulations may provide an interface which allows an examinee to navigate through a simulated software product to the proper location to resolve a problem described in an exam question. However, these simulations only provide user interface functionality for the menus, windows, and controls necessary to navigate to the proper software window to answer the question and to no other parts of the environment. Because the other menus, controls, and windows do not function, an examinee can find the proper screen or problem context quickly by simply using trial and error, at which point answering the question or performing a task may be trivial. Simulations executed by such simulations are often referred to as "closed" or "dumb" simulations because of the limited functionality and navigation paths.

In contrast, an "open" or "intelligent" simulation is one which realistically simulates a computer environment within which a simulation scenario takes place. The open simulation includes logic, rules, and processing ability which allows changes made by a user in the simulation to have a corresponding effect in the simulation. In addition, the open simulation matches the behavior of the actual components of the computer environment so that a user may take multiple navigation paths. Providing multiple navigation paths and ways to perform a task allows a user to truly "trouble shoot" a problem as will be expected in the actual computer environment. The user is free to investigate the simulated computer environment to solve a problem in a manner similar to real life.

Unfortunately, conventional simulators which provide limited openness in the simulations have other limitations. Generally, the data defining a simulation and/or computer environment is tightly integrated with the executable code of the simulators. Therefore, development and revisions to simulations is very expensive because this must be done by programmers instead of less expensive test item writers. The programmers modify the actual simulators to produce different simulations.

One element which quickly defeats the realism of a simulation, is how closely time delays of an actual computer system are simulated. Ideally, for each action performed in a simulation of a computer environment, the delay should be about the same as the delay in an actual computer environment. Users, who interact daily with computers, quickly notice unnatural delays in a simulated computer environment from a few seconds to even less than a second. Retrieving and modifying data from files or a database for use within a simulation can add unavoidable delays in responses to user actions in the simulation. These delays can annoy and distract a user.

Data for a simulation may be stored in data files on the same machine executing the simulation software. Retrieving data from the files may incur a significant time delay because, on average, at least half of the file must be searched for each data value request. A single file or a plurality of separate files may be used.

If a single file is used, the file size may grow so large that reading and re-reading the file to access data causes unnatural time delays in the simulation. If multiple files are used, the files are typically 'flat,' meaning the data is stored in a list of records and the files are not related to each other. Retrieving data may require searching multiple files. The searching, maintaining, and distributing of the data files may be time consuming, complex, and error prone.

To overcome these problems, simulations may utilize a database. Conventional databases are DBMS (Database Management Systems) that provide a very flexible and powerful database which may include features such as automatic backups, security, type checking, integrity constraints and the like. However, in relation to simulations, generally, the more flexible and feature laden a DMBS is, the more overhead processing is involved, causing a greater delay when operating on the data.

Generally, simulation software executes a data request that is serviced by a database communication layer, a database driver, associated with the database. The database driver is software that controls access to the database. The data request is generally in a standardized format such as a SQL (Structured Query Language) statement. Once a data request is made, the SQL statement is interpreted and executed to provide a response that includes the desired data. The extra processing time required for SQL statements may cause noticeable delays in the behavior of the simulation.

The processing time may be further delayed if a RDBMS (Relational Database Management Systems) is used. In a RDBMS, data is organized according to relationships between different sets of data. Optimally, the relationships model real-world relationships between entities that the data is intended to define and represent. When the relationship matches a real-world relationship, the data may be stored in a single table or record of the database. Consequently, database requests involving the data have a minimal time delay.

However, certain data requests involve data which is not related in a manner directly represented in the database. To fulfill such data requests, multiple data indexes, tables, and records may be searched and accessed. This overhead increases the delay in the simulation requesting the data.

DBMSes comprise data files which store data and at least one database driver which is computer-executable code for controlling how the data is stored, accessed, and maintained. The database drivers are separate from the data files and software programs, such as a simulator which uses the database. If the DBMS operates as a server, database drivers may be required on the client computers as well as the server computer.

As a DBMS is upgraded or repaired to resolve software bugs, one or more of these database drivers may need to be replaced. Maintaining the proper versions of database drivers may be burdensome, particularly in a computer lab used to administer a certification exam which includes simulations relying on the database drivers for data from the database. The computer lab may include fifty to one-hundred or more computers that must have the most current database drivers.

A DBMS may involve separate software programs for installation and maintenance of the database. Depending on the size and configuration of the database, some DBMSes require a full-time staff person to administer and maintain the database. DBMSes are very flexible such that data may be provided to a variety of different software applications. However, the flexibility increases delays involved in completing database operations.

To edit data of conventional simulations, the simulation source code is edited and recompiled. A DBMS provides an interface for editing the data. However, edits are generally accomplished using SQL statements. To properly perform edits of the data, users must be trained in the SQL language. This complexity increases the costs of developing and maintaining simulations.

BRIEF DESCRIPTION OF THE DRAWINGS

Non-exhaustive embodiments of the invention are described with reference to the figures, in which.

DETAILED DESCRIPTION

Figure 1:
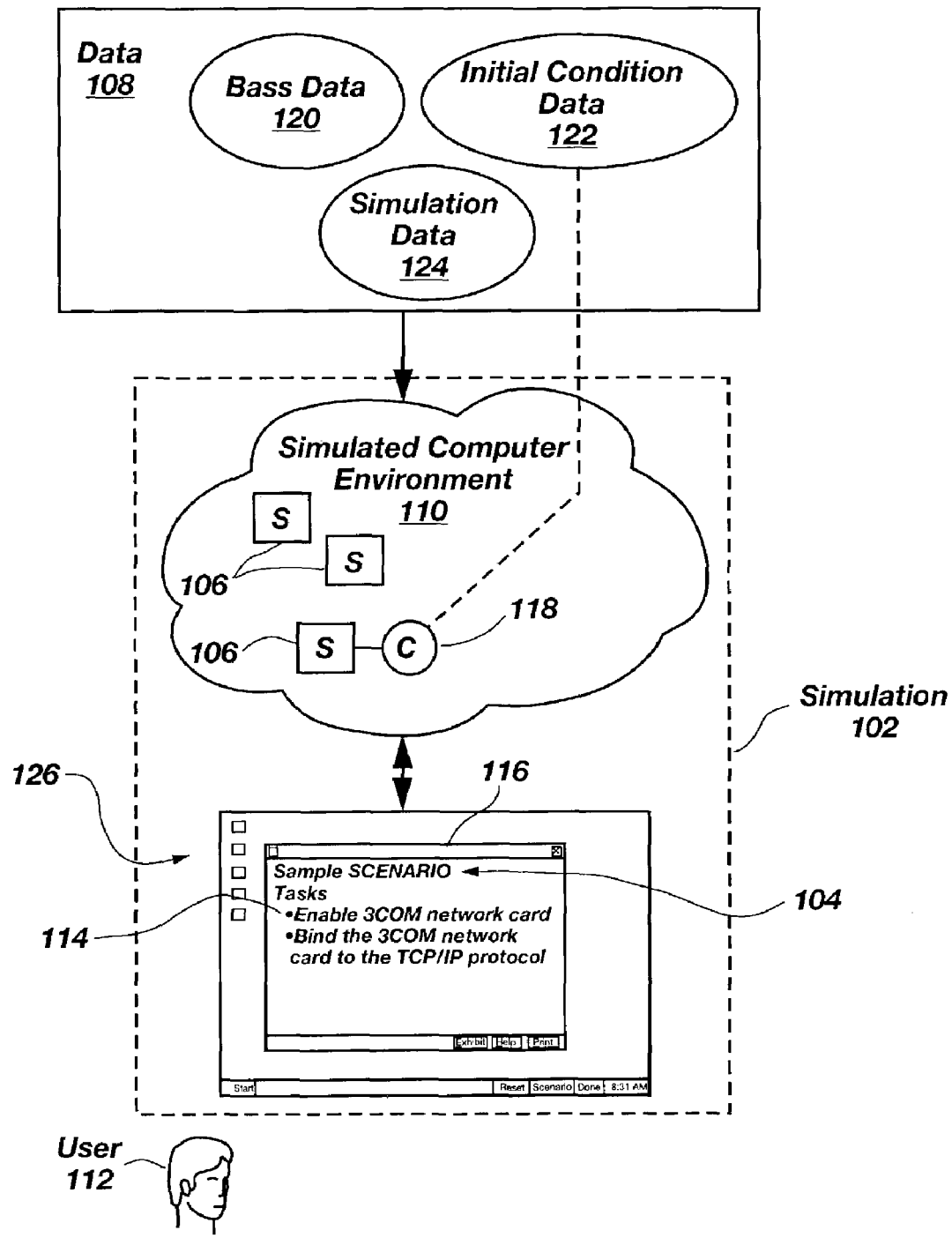
FIG. 1 is a logical relationship diagram illustrating components of one embodiment of the present invention.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

Accordingly, what is needed is a system and method that overcomes the problems and disadvantages of the prior art. The system and method should provide data from a database to simulate a computer environment such that a user is provided with a realistic experience in configuring systems, trouble shooting and resolving problems. Specifically, the system and method should allow data operations, such as data retrieval and data modification within the simulated computer environment, without noticeable delays. The system and method should allow direct access by simulators representing the simulated computer environment to the data of the database without any intermediate request translation such as required to satisfy SQL statement requests. The system and method should use a hierarchical database structure to avoid possible delays caused by relational database structures. The system and method should also not require that database drivers be installed and maintained.

The present invention relates to a system and method for a hierarchical database management system for educational and competency training simulations that addresses all of the above-identified problems and disadvantages.

In one embodiment, the hierarchical database management system includes a database. Data within the database is organized according to a data schema that defines different types of records in the database. The database records define simulated components of a simulated computer environment. The database also includes links defining hierarchical relationships between records of the database. Preferably, each record represents a single simulated component. A simulated component represents a hardware or software component in an actual computer environment.

The hierarchical database management system includes database code. The database code is software programmed to add, delete, modify, and retrieve records and links in the database. The database code is also capable of being integrated with a software module for maintaining and generating a simulated computer environment. Alternatively, the database code may be separate from the software module.

The present invention includes a method for providing data in a simulated computer environment. The method includes executing a simulator comprising object-oriented database code programmed to retrieve data from a database for populating simulated components to simulate the computer environment. Preferably, the database code is compiled into the simulator. Of course, a plurality of simulators may be executed, each simulator comprising database code.

Next, a record is requested from the database by a dot notation command in the computer-executable code of the simulator. The dot notation references an object of the database code.

Preferably, the request is serviced using a method defined for the referenced object of the database code. In certain embodiments, rather than requesting a record, a direct call to a field in a record of the database may be made using a dot notation command. The dot notation commands use methods of the database code. The database code methods access, modify, and delete data values within the database for the specified field in the direct call.

Based on the record, the simulator generates a simulated component. The simulated component is used by the simulator to simulate the simulated computer environment. Of course, where a plurality of records is provided, a plurality of simulated components may be generated. The simulated component may comprise substantially any hardware and/or software component of a computer environment. For example, files, file folders, hard drives, network connections, network protocols, network cards, a computer workstation, and the like may be represented in the simulated computer environment as simulated components.

In certain embodiments, the present invention includes a method for populating a database used to define simulated components in a simulated computer environment. The method begins by receiving a user-initiated request on a source computer system to automatically populate a database with records defining simulated components. Generally, the user-initiated request originates from a user operating a database editor on the source computer. In certain embodiments, the source computer and destination computer are the same computer.

In response to the user-initiated request, configuration information for actual components of a target computer system in communication with the source computer system is automatically collected. The configuration information is used to automatically generate records for a database. The records define simulated components which substantially correspond to actual components defined by the configuration information. These records are then stored in a database.

The present invention provides a hierarchical database management system which provides fast access to data used to simulate a computer environment such that delays caused by data operations is minimal. The present invention allows simulators for the simulated computer environment direct access to retrieve and modify data in a database. The present invention uses a hierarchical database structure which very closely models the organization of actual computer components in actual computer environments in order to reduce the possibility of delays in using data in the database. The present invention includes a hierarchical database management system which requires no installation or maintenance above and beyond the installation necessary to simulate the computer environment.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, user selections, network transactions, database queries, database structures, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Referring now to FIG. 1, a block diagram illustrates logical relationships between components according to one embodiment of the present invention. In certification exams, a simulation 102 of an IT scenario 104 for teaching and measuring a user's proficiency is preferred over conventional exam questions.

Conventionally, those most qualified to author these simulations 102 were computer programmers. Often, a computer program such as a shockwave multi-media presentation is written to simulate actual computer components and/or software. However, as certification exams have advanced and become more specialized, those most qualified to author a simulation 102 have become exam test item writers. These are individuals trained in writing exam questions both conventional and simulation based. Therefore, authoring or modifying conventional simulations required collaboration between an exam test item writer and a computer programmer. This duplicate effort is expensive.

As shown in FIG. 1, one or more simulators 106 implement a simulation 102, discussed more fully below. The simulation 102 includes a scenario 104 which describes the problem or issue to be resolved. For example, generally the phrase "Sample SCENARIO" is replaced by one or more paragraphs describing a technical situation a user must resolve.

Preferably, the simulators 106 are separate and distinct from data 108 used by the simulators 106. By separating the data 108 from the simulators 106 which implement the simulation 102, a computer programmer is only required to initially define the simulators 106. However, an exam test item writer may define and refine the data 108 to generate a simulated computer environment 110 which presents different simulations 102 to a user 112. Thus, the simulators 106 which implement the simulated computer environment 110 are re-used while the data 108 is changed as needed.

Generally, each simulation 102 presents a single simulator-based question to an user 112, an examinee, during a certification exam. Of course, the same simulation 102 may be used to teach an IT concept, present a simulated certification exam, or illustrate a concept to the user 112.

Preferably, the simulation 102 presents a scenario 104 to provide context for the simulation 102. The scenario 104 describes a problem or question a user 112 is to resolve. The scenario 104 may also describe the simulated computer environment 110. Preferably, the scenario 104 includes a set of tasks 114 which tell a user what to do to address the item being examined. However, the tasks 114 generally do not indicate how to perform each task 114. The tasks 114 are descriptions of steps, or operations, a user must complete in the simulated computer environment 110 in order to successfully complete the simulation 102. The tasks 114 may be unordered and unrelated. Alternatively, the tasks 114 may be sequential with each task 114 altering the simulated computer environment 110 in some manner in preparation for the following task 114. The tasks 114 and scenario 104 may be described in a simulation window 116, described in more detail below.

Alternatively, the user 112 is left to discover the context of the simulated computer environment 110 on his/her own. This context is what has conventionally been difficult to present to an IT examinee using conventional exam questions. The simulated computer environment 110 presents the context in substantially the same manner as a user 112 would experience with the actual computer environment. Specifically, the user 112 must interact with the environment 110 to discover the context.

The simulation window 116 may display when a simulation 102 first starts. A user 112 may close the simulation window 116 if desired. The simulation window 116 may include a button for soliciting help, a button for printing the scenario description 104 and task list 114 and a button for displaying an exhibit (not shown). An exhibit may display a graphic image which further aides in providing context to the user 112 for the particular simulation 102. Of course different buttons of the simulation window 116 may be invisible or unavailable when the simulation 102 is used in a certification exam. Alternatively, additional buttons may be provided in a certification exam which are not present when the simulation 102 executes in a training package.

Referring still to FIG. 1, the simulators 106 provide a frame work for the data 108 which defines the simulated computer environment 110. Preferably, a plurality of simulators 106 are used to simulate the simulated computer environment 110. Alternatively, a single simulator 106 may be used. The simulated computer environment 110 may represent an actual personal computer, one or more computers connected on a network, an operating system, a computer application, or the like. The size and scope of the simulated computer environment 110 depends on the base data, described in more detail below, and the purpose of the simulation 102.

Conventionally, in order for a student or examinee to test his or her IT proficiency, the student accesses a lab of actual computers on an actual network which is configured especially for the user to practice or prove their skills. However, such labs are expensive and generally allow only one user to test his/her skills at any one time. In addition, changes made by one user modify the lab environment such that a second user cannot concurrently use the lab. In contrast, embodiments of the present invention allow for a computer environment 110 of almost any size to be easily simulated which allows many users to test their skills using conventional computer equipment.

Generally, the simulators 106 are executable software code compiled for an all-purpose computer. Of course, the simulators 106 may also be interpreted code, byte code, or the like. A simulator 106 provides the logic, rules, features and functionality, and processing ability which emulates actual software and/or hardware of an actual computer environment.

Preferably, the simulators 106 are identifiably distinct from each other in the form of separate computer-executable code (i.e., separate executables). However, during execution of the simulators 106, the simulators 106 interact with each other to provide an appearance of one single simulator to a user 112. The distinct simulators 106 cooperate to simulate the computer environment. Alternatively, the simulators 106 may be integrated in one single set of computer-executable code.

The simulated computer environment 110 includes one or more simulated components 118. A simulated component 118 is a representation of an actual component in a software and/or computer system. Preferably, simulated components 118 are implemented using software objects. The simulated component 118 includes data which defines the attributes, features, functions, and operational status of an actual component. For example, a simulated component 118 for a hard drive may include the manufacturer name, date installed, whether the drive is external or internal, a version identifier, and a listing of the drivers which provide access to the drive.

Of course, other attributes, features, and functions may be included in the simulated component 118. The data which defines the attributes, features, functions, and operational status of a simulated component 118 is referred to as a characteristic (not shown). A characteristic may also define sub-components of a simulated component 118. The sub-components are typically components of an actual system which do not allow functional interaction with a user. For example, a software DLL (Dynamic Link Library) may be represented by one or more characteristics which display the status of installed DLL files.

In one embodiment, a simulator 106 is executed and associated with a simulated component 118. Preferably, the simulator 106 simulates a software application commonly found in a conventional computer environment. The simulator 106 may simulate any software application of a computer environment.

In one example, the simulator 106 simulates a windows file explorer application. The simulator 106 may be associated with one or more "files" which are implemented through simulated components 118. Alternatively, a simulator 106 may simulate a hardware component of an actual computer environment.

In certain embodiments, data 108 comprises a collection of base data 120, initial condition data 122, and simulation data 124. Base data 120 defines the simulated components 118. Base data 120 is data which also defines the characteristics of simulated components 118 which are associated with one or more simulators 106. The base data 120 comprises the values which make the simulated component 118 in the simulated computer environment 110 realistic.

For example, a simulator 106 may define functionality which emulates a personal computer connected to a network. However, the base data 120 defines the name of the computer, the IP address for the computer, the number of disk drives present in the computer, the various networking protocols supported by the computer and other such information. In addition, the base data 120 may also define three, four, or twenty computers which use the same simulator 106 but represent different computers on a network in the simulated computer environment 110.

Preferably, the base data 120 includes data for a plurality of simulated components 118 which exist in the simulated computer environment 110. The base data 120 defines the simulated components 118 such that all the components 118 interoperate normally. In other words, the simulated computer environment 110 functions in a similar manner to an actual operational computer environment being simulated.

The initial condition data 122 is data which modifies one or more characteristics of one or more simulated components 118 defined by the base data 120 (as indicated by a dashed line from initial condition data 122 to a simulated component 118). The initial condition data 122 allows for certain simulated components 118 in the simulated computer environment 110 to be rendered unusable, missing, improperly configured, malfunctioning, or the like. Generally, the initial condition data 122 modifies the simulated computer environment 110 from one which functions properly to one which requires troubleshooting, maintenance, or other skills of an IT professional. The initial condition data 122 may also be used to define new simulated components 118 or remove simulated components 118 which were defined in the base data 120.

By accessing the base data 120 and modifying the base data 120 with initial condition data 122, a simulated computer environment 110 is defined for use in simulator-based exam questions. Generally, a simulator-based exam question is presented to an examinee, a user 112, in the form of a simulation 102 which includes a scenario 104. Data 108 such as text describing a scenario 104 and other aspects of the simulation 102 are stored as simulation data 124.

A system user interface 126 is provided to allow the user 112 to interact with the simulation 102. Preferably, to provide more realistic simulations 102, the system user interface 126 is substantially identical to an actual user interface the user 112 would interact with to control and manipulate an actual computer environment.

Generally, the system user interface 126 emulates the main tool or software technology being taught or tested for a certification exam. In one embodiment, the system user interface 126 emulates a user interface for one of the Windows® family of operating systems. Alternatively, the system user interface 126 may emulate other operating systems such as LINUX, UNIX, MAC, and the like.

In another embodiment, the system user interface 126 may emulate a frame of reference which is common among those skilled in working with the IT being taught or tested. For example, IT technicians generally control and manage routers using a terminal window. The type of operating system is not relevant to use of the terminal. Therefore, rather than emulating an operating system, a network map illustrating routers communicating on a network in the simulated computer environment 110 may be provided from which simulated terminal windows may be launched to configure and control the routers in the network map.

A network map is one example of a common frame of reference understood by those who manage routers. Because the system user interface 126 is separate from the data and simulators 106, the system user interface 126 may be changed to present a system user interface 126 corresponding to a common frame of reference or an actual user interface associated with IT concepts being tested.

As the user 112 uses the system user interface 126, user interactions are recorded. Generally, the interactions are recorded as tasks which a user has completed by using or controlling one or more of the components within the simulated computer environment 110. Preferably, these tasks are compared with those set forth in the scenario 104 to determine how well the user 112 completed the simulation 102.

Figure 2:
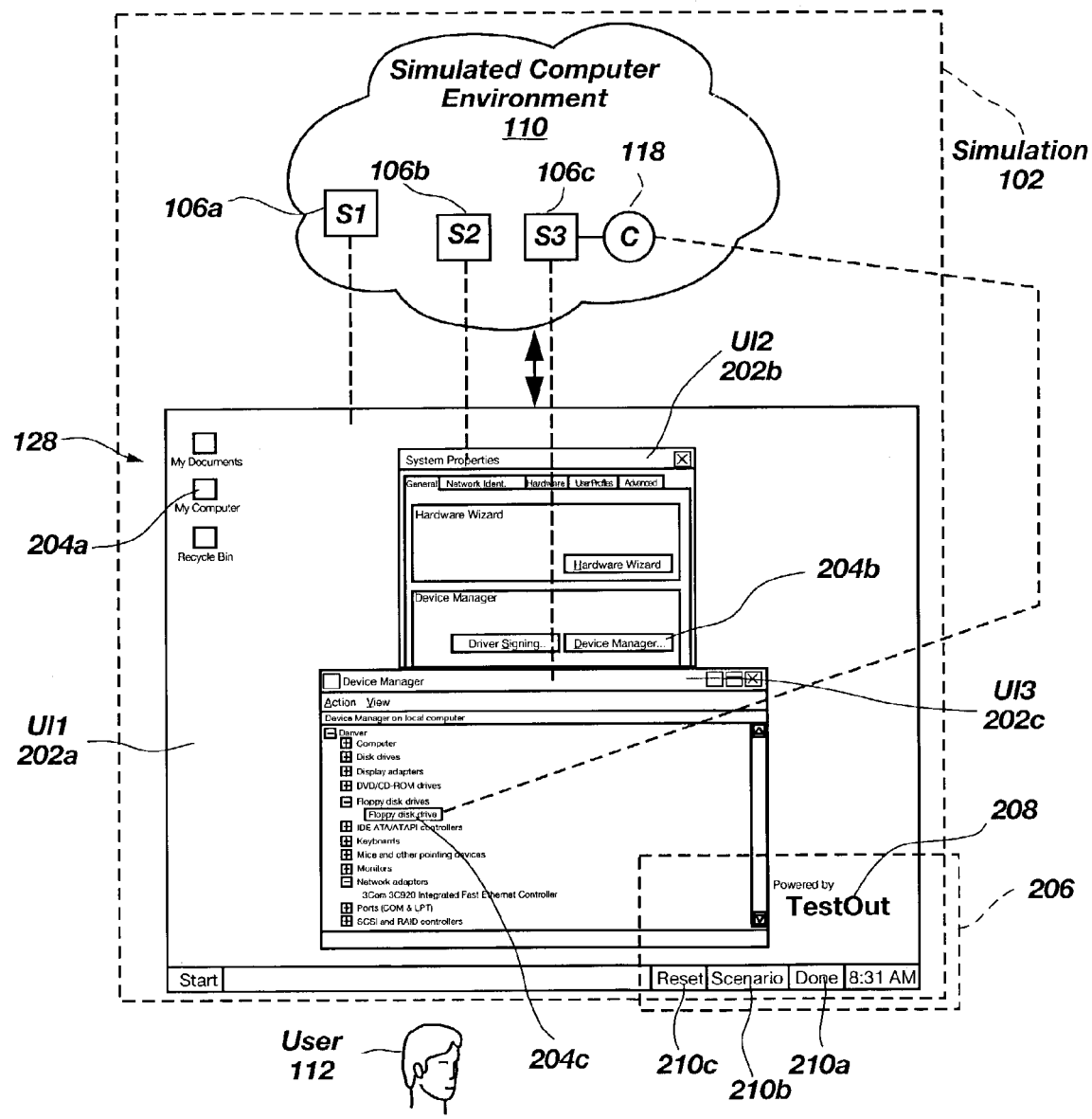
FIG. 2 is a block diagram illustrating one embodiment comprising user interfaces, simulators, and simulated components used to interact with a user.

FIG. 2 illustrates a typical simulated computer environment 110 which represents a single computer. The simulated computer environment 110 includes a plurality of simulators 106a-c. As mentioned above, the simulators 106 are preferably implemented using object-oriented software object code. Each simulator 106 is defined to simulate the features and functionality of actual devices and/or software modules. Generally, each simulator 106 corresponds one-to-one with a hardware device or software module of a computer system.

Alternatively, simulators 106 are defined to simulate multiple hardware and/or software modules having common features and functions. For example, a single network connection simulator 106 (not shown) may simulate ethernet, wireless, and token-ring networking protocols due to similarities between the protocols.

The simulators 106 cooperate to simulate a computer environment 110 which may include as many, or as few, simulated components 118 as desired. Using multiple simulators 106 provides flexibility. When deployed, a particular simulation 102 may include only the necessary simulators 106 for that simulation 102 rather than excess code which will not be used. Thus, the size of a simulation 102 may be controlled and minimized. In addition, new simulators 106 are easily developed and added to keep up with new technologies.

Preferably, each simulator 106a-c is associated with a user interface 202a-c. Collectively, the user interfaces 202a-c make up the system user interface 126. Generally, the system user interface 126 simulates a single actual computer system which a user 112 may be required to use to solve an IT problem.

In the illustrated embodiment, a first simulator 106a is associated with a first user interface 202a. Similarly, a second simulator 106b is associated with a second user interface 202b. The simulators 106a-b provide features and functionality in response to user inputs and commands through the user interfaces 202a-b. In this manner, a user 112 may interact with the simulated computer environment 110.

In alternative embodiments, certain simulators 106 may not have a user interface 202. Instead, the simulator 106 may interact with simulators 106 which have user interfaces 202 and provide functionality which does not require a user interface 202. For example, a router simulator (not shown) may simulate functionality of a router and interact with a terminal services simulator 106 which simulates giving commands and receiving responses to control and/or configure a router.

A simulation 102 may be executed according to a predetermined set of configuration parameters. Certain configuration parameters may include which interface 202a-c is displayed when a simulation 102 is initiated, how many interfaces 202a-c are displayed, where the interfaces 202a-c are positioned, and the like. In one embodiment, a single user interface 202a is displayed. Alternatively, two or more user interfaces 202a-c may be displayed simultaneously. In this manner, the simulation 102 may be configured to assist the user 112 in navigating to an appropriate window to complete the simulation 102. These simulation configuration parameters may be defined by a simulation author and stored as simulation data 124 (See FIG. 1).

Once a simulation 102 is initiated, the user 112 determines which user interfaces 202a-c are displayed. Actions of the user 112 in a first user interface 202a control whether a second user interface 202b is displayed. In certain embodiments, actions of a user 112 in a first user interface 202a may cause a new simulator 106 of a particular type to be instantiated.

In FIG. 2, a first simulator 106a is a desktop for a simulated operating system. The associated user interface 202a is an operating system desktop. A second simulator 106b is a simulated administration tool with an associated administration tool user interface 202b, for example a system properties window. Of course one or more additional simulators 106 may be executed subsequent to the second simulator 106b. Those of skill in the art will quickly recognize that the desktop user interface 202a and administration tool user interface 202b are substantially identical to actual desktop and system properties administration tools.

Alternatively, the first simulator 106a may be an administration tool with an associated user interface 202. Thus, a simulation 102 may include simulators 106a-b and user interfaces 202a-b for a simulated desktop and administration tool, an administration tool alone, a plurality of administration tools or any permutation of these. Although the illustrated interfaces resemble those of a WINDOWS® operating system, the invention may be used for simulations of desktops and administration tools of other operating systems and computer systems.

Preferably, the simulators 106a-c interact. In one embodiment, certain interaction is provided by one or more triggers (not shown) included in the user interfaces 202a-c. A trigger is an event caused by user interaction with a user interface 202a-c. User interface elements 204 including icons, buttons, menus, menu items, text boxes, radio buttons, check boxes and the like may be associated with a trigger. When a user 112 activates one of these user interface elements 204 a trigger associated with the particular user interface element 204 is activated.

Preferably, activation of a trigger in a first simulator 106a causes a second simulator 106b to be launched. Alternatively, the activation of a trigger may cause the interface 202a of the first simulator 106a to be modified just as in the real computer environment being simulated. In addition, based on the type of the second simulator 106b, a second user interface 202b may be displayed. Generally, if multiple user interfaces 202a-c are displayed, the interfaces 202a-c are displayed in a similar manner to those of an actual computer system such that a user perceives the user interfaces 202a-c collectively as one system user interface 126.

Likewise, a user interface element 204 of a second user interface 202b may activate a trigger in the second simulator 106 which, in turn, launches a third simulator 106c and associated user interface 202c. Similarly, each simulator 106a-c may include triggers which launch one or more other simulators 106a-c with or without associated user interfaces 202a-c.

By way of example, in FIG. 2, a user 112 may right-click on the user interface element 204a, the "My Computer" icon. In response, a pop-up menu (also a user interface element 204 but not shown) may be displayed from which the user 112 may select the "properties" menu item (also a user interface element 204 but not shown). The "properties" menu item is associated with a trigger such that selection of the "properties" menu item causes a second simulator 106b to be launched with its corresponding user interface 202b. Next, the user 112 may click the "device manager" button 204b which activates a trigger in the second simulator 106b causing a third simulator 106c to be launched. The third user interface 202c may include a simulated component 118 the user 112 is expected to interact with in order to complete a task 114 (See FIG. 1) for the scenario 104 (See FIG. 1). The simulated component 118 is represented in the third user interface 202c by the user interface element 204c (indicated by a dashed connecting line). The user 112 may then activate the user interface element 204c to modify the configuration for the simulated component 118.

Of course, additional user interface elements 204 besides those mentioned may be associated with triggers and a plurality of simulators 106 may be launched in similar manner to that described. In addition, other user interface elements 204 may be activated to stop execution of one or more simulators 106.

Preferably, the triggers are associated with the same user interface elements 204 and activated by the same interactions with the user interface elements 204 as in an actual computer environment such as an operating system. In addition, the icons, windows, menus, buttons and other user interface elements 204 are substantially the same as those of the actual computer environment. Therefore, a user 112 enjoys a very realistic experience when activating triggers within the simulation 102.

In one embodiment, a simulator 106 includes a plurality of triggers which launch a plurality of other simulators 106. For example, each icon on the user interface 202a may be associated with a trigger for launching a different simulator 106. Alternatively, multiple user interface elements 204 may be associated with the same trigger. For example, the "My Computer" icon 204a may activate the same trigger to launch the second simulator 106b when a user 112 double-clicks the icon 204a as when a user 112 selects the "properties" menu item for the pop-up menu, as described above.

Conventionally, computer systems offer a variety of ways to activate and access different components and administration tools. These different ways may be referred to as navigation paths. The process described above in relation to FIG. 2 for launching the simulators 106a-c describes one example of a navigation path. These navigation paths may be activated through a desktop user interface, hot-keys or the like. Certain navigation paths may be more efficient in providing an IT user with access to an appropriate simulated component 118 to resolve an IT issue than others. However, a user 112 may become accustomed to using a particular navigation path. Thus, the invention provides multiple navigation paths by associating triggers with the user interface elements 204 and providing for different activation methods for the user interface elements 204. These activation methods and triggers substantially mimic the behavior of the user interfaces of actual computer systems.

Navigation paths in the simulation 102 may offer disadvantages for a user 112 which improve the effectiveness of testing and/or teaching simulations 102. Because multiple navigation paths are available and these are substantially the same as in the actual computer system, a user 112 who does not have sufficient proficiency with the IT may become lost in the system user interface 126 as he/she attempts to complete the tasks 114 (See FIG. 1). The possibility that a user 112 may take an incorrect navigation path improves the realism of the simulation 102. In addition, multiple navigation paths allow a user 112 to interact naturally with the simulation 102.

Preferably, the system user interface 126 includes a simulation interface 206. The simulation interface 206 allows a user to interact with the simulation 102 rather than the other simulators 106a-c. Preferably, the simulation interface 206 is unobtrusive. In one embodiment, the simulation interface 206 may be integrated into a first desktop user interface 202a. Of course, the simulation interface 206 may also be a floating window which stays on top of the display, a dockable button bar, a set of keys on a keyboard, or other like implementations which allow user interaction with the simulation 102 being executed. All other implementations of a simulation interface 206 are considered within the scope of the present invention.

Referring still to FIG. 2, the simulation interface 206 may include a logo 208 and one or more control buttons 210a-c. The logo 208 may be a graphic image representing the producer of the simulation 102, a trade or service mark, an image representing the creator of the simulators 106, and/or advertising. The control buttons 210a-c allow a user 112 to control operation of the simulation 102.

In the depicted embodiment, the control buttons 210a-c are integrated with a main navigation bar of the first user interface 202a. A "Done" control button 210a stops the simulation 102, closes all the user interfaces 202a-c and stops the simulators 106a-c. In certain embodiments, activating the "Done" button 210a may also initiate an evaluation process which includes grading and/or reporting how well a user 112 performed the tasks 114 (See FIG. 1).

A "Scenario" control button 210b displays the simulation window 116 (See FIG. 1) which allows the user 112 to review the scenario description 104 and tasks 114. A "Reset" button 210c allows the user 112 to return the simulation 102 to the same condition which exists when the simulation 102 is first started. Generally, activating the "Reset" button 210c reverts any modifications made in the simulated computer environment 110 to the condition of the simulation 102 before any changes were made.

In embodiments in which the simulation 102 is integrated with a certification exam, the simulation interface 206 may include exam question navigation buttons (not shown) such as "forward", "back", "beginning", and "end." These buttons allow the user 112 to move between exam questions and simulations 102 of a certification exam.

Figure 3:
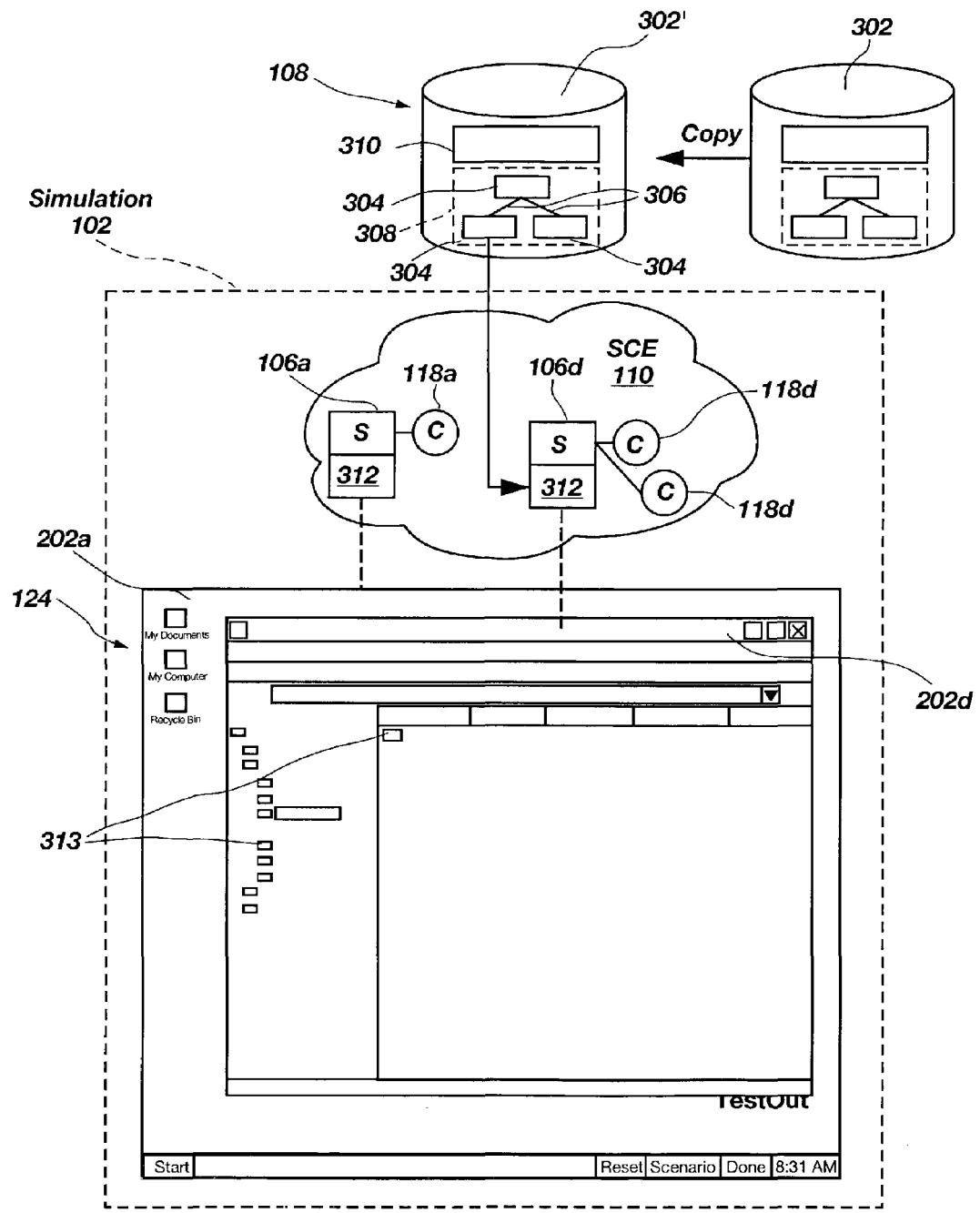
FIG. 3 is a block diagram illustrating one embodiment of the present invention accessing data in a database to present a simulated computer environment.

Referring now to FIG. 3, in a certain embodiment, the data 108 is stored in a database 302. The database 302 stores records 304 which define simulated components 118 in the simulated computer environment 110. The database 302 also stores links 306 which represent a hierarchical relationship between records 304. Generally, the links 306 comprise a pointer (not shown), or other reference, stored in a particular record 304 which indicates the location of one or more records 304 related to the particular record 304 according to a hierarchy.

Preferably, the database 302 is configured to be shared between multiple users. For example, the base data 120, initial condition data 122, and simulation data 124, may be accessed by multiple examinees taking a certification exam. One set of base data 120 may be shared among multiple users and used in multiple simulations 102. One set of initial condition data 122 may be shared among multiple users and multiple simulations 102, only the tasks required of a user may change. Each simulation 102 may include different simulation data 124. However, the simulation data 124 may be shared among multiple users. The base data 120, initial condition data 122, and simulation data 124, may be stored in a single database 302 or a plurality of databases 302.

Generally, when a simulation 102 is started, an original database 302 is copied to create a temporary database 302' which is accessed by the simulation 102. If data in the simulation 102 is modified, the modifications are stored in this temporary database 302' using the database code objects 312. Alternatively, the original database 302 may be used and modifications may be stored in a separate file or another database. Using a temporary database 302' protects the integrity of the original database 302, and provides a simple process for sharing the database 302 among a plurality of users 112. The temporary database 302' may be used for evaluation of a user's performance.

Of course, creation of the temporary database 302' may include merging one or more original databases 302. For example, a separate database 302 may exist for holding base data 120 and another separate database 302 may exist for holding initial condition data 122. These two databases 302 may be copied and merged to create the temporary database 302'.

Preferably, the database 302' includes a binary file 308 and an index 310. The binary file 308 holds the records 304 which may be stored as sequential arrays of fields of various types. Of course, the database 302' may also be implemented using a text file organized according to an XML (eXtended Meta Language) or other meta-language protocol instead of a binary file 308. Alternatively, or in addition, the binary file 308 may be encrypted. Generally, a single hierarchy of records 304 is stored in each database 302'. Alternatively, a plurality of hierarchies may be stored in a single database 302'.

An index 310 allows specific records 304 to be located quickly within the binary file 308 based on some organizational criteria. Preferably, since the database 302' is a hierarchical database, the index 310 is organized according to the hierarchy defined by the links 306 between records 304. For example, the index 310 may comprise a list of record location indicators organized according to a popular hierarchical tree search algorithm. In one embodiment, the index 310 may comprise a list of record location indicators in the binary file 308 based on a breadth-first search of the hierarchy. Alternatively, the record location indicators may be organized based on a depth-first search. Of course, a plurality of hierarchies may be listed in the index 310.

In some embodiments, the index 310 includes information about the hierarchy for each record 304 listed in the index 310. For example, the index 310 may include what level in the hierarchy the record 304 holds. The index 310 may also indicate the type of the record 304, fields for the record 304, and their associated field types.

The database 302' is accessed by database code 312. The database code 312 provides the functionality to add, delete, modify, and retrieve records 304 and the corresponding links 306 from the database 302'. Preferably, the database code 312 is programmed such that the code 312 may be integrated with a software module, specifically a simulator 106. A simulator 106 uses the database code 312 to access records 304 for generating and maintaining simulated components 118. The records 304 may modify or adapt a user interface 202d within the simulated computer environment 110 corresponding to the simulator 106d. As mentioned above, the simulated components 118a, d and user interfaces 202a, d cooperate to present a simulation 102 (See FIG. 2) for a simulated computer environment 110.

The simulator 106d using simulated components 118d and a user interface 202d may represent and simulate a graphical administration tool such as windows explorer or device manager in a windows® operating system. Generally, data relating to actual computers and computer environments are organized and presented in a hierarchy. The hierarchical structure provides an intuitive organization of the information, and allows for more detailed information to be hidden as one level of the hierarchy is reviewed. Consequently, a majority of graphical administration tools present data about actual computer environments as a hierarchy.

Similarly, the simulated graphical administration tools present simulated components 118d defined by records 304 of the database 302'. The simulated components 118d are presented in a hierarchy defined by links 306 between the records 304. Preferably, the presented hierarchy substantially corresponds to the hierarchy of actual components in an actual computer system.

In certain embodiments, the records 304 include an icon field which defines an icon 313 associated with the simulated component 118d. Preferably, the icon 313 is substantially the same icon as used with actual components of an actual computer system. Using the same icons 313 enhances the realism for a simulation 102.

Preferably, a simulator 106 is defined by object-oriented computer-executable code. Those of skill in the art recognize the advantages of object-oriented code for such benefits as encapsulation, inheritance, polymorphism, and the like. In addition, the database code 312 is preferably object-oriented computer-executable code. Alternatively, the simulators 106 and database code 312 may be written in standard, top-down, PASCAL like fashion.

Because the simulator 106 and database code 312 are both object-oriented, the database code 312 is preferably defined as a separate class, which may then be included as an attribute of a base class, from which the class defining the simulator 106 inherits. Alternatively, a base class for the simulator 106 may include methods and attributes which define properties and functionality for the simulator 106, as well as methods and attributes which define the database code 312. In another alternative, a message class (not shown) may be defined which passes messages between objects implementing the database code 312 and the simulator 106.

Preferably, the database code 312 and simulator 106 are implemented in base classes from which more specific classes inherit. Thus, when a simulator 106 is instantiated, the simulator 106 includes the functionality of the database code 312. This generally means the database code 312 is compiled and made a part of the simulator 106. As mentioned above, depending on how the database code 312 and simulator 106 are defined in the object classes, the database code 312 may be duplicated for each instantiation. Alternatively, a common set of database code 312 may be shared among a plurality of instances of simulators 106.

Combining the database code 312 with the simulator 106 provides a number of benefits. Preferably, the simulators 106 are separate executables. By providing integrated database code 312, each simulator 106 may operate on data from the database 302' autonomously. If a particular simulator 106 is waiting for user input or "hung up" in the operating system (no longer executing as normal), other simulators 106 may not be affected.

As mentioned above, the combination allows for quick access to data in the database 302' because no messages are passed between separate sets of computer executable code. There are no intermediate layers of database drivers and/or other middleware which causes delays as a request for data, such as a SQL statement, is interpreted and fulfilled. A conventional data request may also be delayed because of database drivers or middleware such as a database server which must be loaded and/or executed.

Instead, in certain embodiments, the simulator 106d comprises object-oriented database code 312 which is programmed to directly access the database 302' to retrieve database records 304. First, a simulator 106d is executed. Once the simulator 106d initializes, the simulator 106d may be programmed to generate simulated components 118 and display these in the user interface 202d.

Accordingly, the simulator 106d code is programmed to request a record 304 from the database 302' according to dot notation. The dot notation command in the simulator's source code references an object (not shown) of the database code 312. The object represents a record 304 within the database 302'. Alternatively, dot notation may be used to request a field within a record 304. In addition, the database code 312 may include methods for following links 306 to access records 304 which are sibling, parent, and/or child records 304 of a particular record 304.

Using dot notation, a record 304 may be temporarily assigned to a variable in the computer-executable simulator code. The variable may comprise an interface variable. Alternatively, dot notation may be used to assign a retrieved record field value to a variable. Similarly, a record 304 and/or record field value may be altered by an assignment or other expression in the source code.

In one implementation, the database code 312 defines an interface for each type of record 304 which will exist within the database 302'. The interface enables inter-object communications. The interface allows for a simulator object to make references to a record object defined by the interface. For example, the interface may include a set of defined functions which correspond to the public functions defined for the class defining the specific record type. The interface may also list a set of properties which represent fields within the specific record 304.

The following computer source code represents an example of an interface definition and its corresponding class definition for a Printer type of record. A Printer type of record may represent a simulated printer 118 which is installed in a particular computer.

```
IPrinter = interface
    ['{A85C8265-C0EE-45D3-BA4C-9C4DEDA2F479}']
    function GetName : String;
    procedure SetName(Value : String);
    procedure BeginUpdate;
    procedure EndUpdate;
    procedure CancelUpdate;
    property Name : String read GetName write SetName;
end;
TPrinter = class(TTypedRecBase,IPrinter)
protected
    function GetName : String;
    procedure SetName(Value : String);
public
    constructor Create(ALeaf : TTreeLeaf);
    property Name : String read GetName write SetName;
end;
```

The GetName function and SetName procedure are accessor functions for the TPrinter object which respectively retrieve or set the Name attribute for the TPrinter object. The Name attribute corresponds to a field for the Printer record 304. These, and other accessor functions, are defined in a base class from which TPrinter inherits. The GetName and SetName methods of the base class are programmed to read and write data for particular records 304 and/or fields of records 304 in the database 302'.

Writing source code to produce similar interfaces and class definitions for each type of record 304 within a database 302' quickly becomes tedious and increases the possibilities of errors. Furthermore, editing the classes and interfaces, once created, may cause significant programming overhead. Thus, in certain embodiments, a database editor (not shown) is provided. The database editor allows for the record types and field definitions within the records 304 to be modified. In other words, the structure for the database records 304 and fields is modified. The database editor automatically generates the necessary source code (similar to that above) to define interfaces and class definitions for record and/or field type changes made within the database editor. The database editor also generates a data schema, discussed in relation to FIG. 6. By using a database editor to modify the structure of the database 302', the database code 312 remains substantially error-free.

Preferably, due to speed benefits, inter-object communication using interfaces is performed in RAM (Random Access Memory) which holds instantiated simulator 106 and database code 312 objects. Alternatively, inter-object communication may be accomplished between computers over a network.

Dot notation commands are a short-hand method, well known to those of skill in the art, for referencing methods and attributes of objects in an object oriented language. The typical format for dot notation is ObjectName.Method (or Attribute) Name. Dot notation allows a source code command to reference methods or attributes multiple levels within inherited objects. When the source code is compiled, the dot notation is interpreted and replaced with the appropriate computer-executable code for accessing or modifying methods and/or attributes of existing objects.

At compile time, the dot notation is also checked to ensure that proper variable types are being used. This is commonly referred to as "type checking." By type checking at compile time, errors in the types of data being assigned or retrieved may be quickly identified and corrected. Where the types for objects include types of records 304 and fields in the database code 312, such as in embodiments of the present invention, the type checking ensures that valid data is being retrieved and written to the database 302'. Such checks ensure the integrity and accuracy of the database 302'.

In the present invention, once a record 304 is requested using dot notation, the request is serviced by identifying the object and function to be performed, and executing the function. Generally, dot notation is used either to read from, or write a new value to a record object or field within a record object of the database 302'. To read a value, the desired object is listed on the left of the dot and the desired field is listed on the right. For example, "Printer.Name" reads the current value of the name attribute in the "Printer" object from the database 302'. The record 304 and/or field value may then be assigned a new value. If so, accessor functions of the database code 312 identify that the record 304 or field value has changed. The accessor functions store the new value back in the database 302' when the source code involving the record object goes "out of scope." Alternatively, a specific command may be issued to cause a record 304 and/or field value to be updated permanently in the database 302'.

Referring still to FIG. 3, a record 304 of the database 302' corresponds to a simulated component 118 for the simulation 102. Thus, once a record 304 has been retrieved from the database 302', a simulated component 118 is generated from the record 304. FIG. 3 illustrates retrieval of data 108 to generate simulated components 118.

Figure 4:
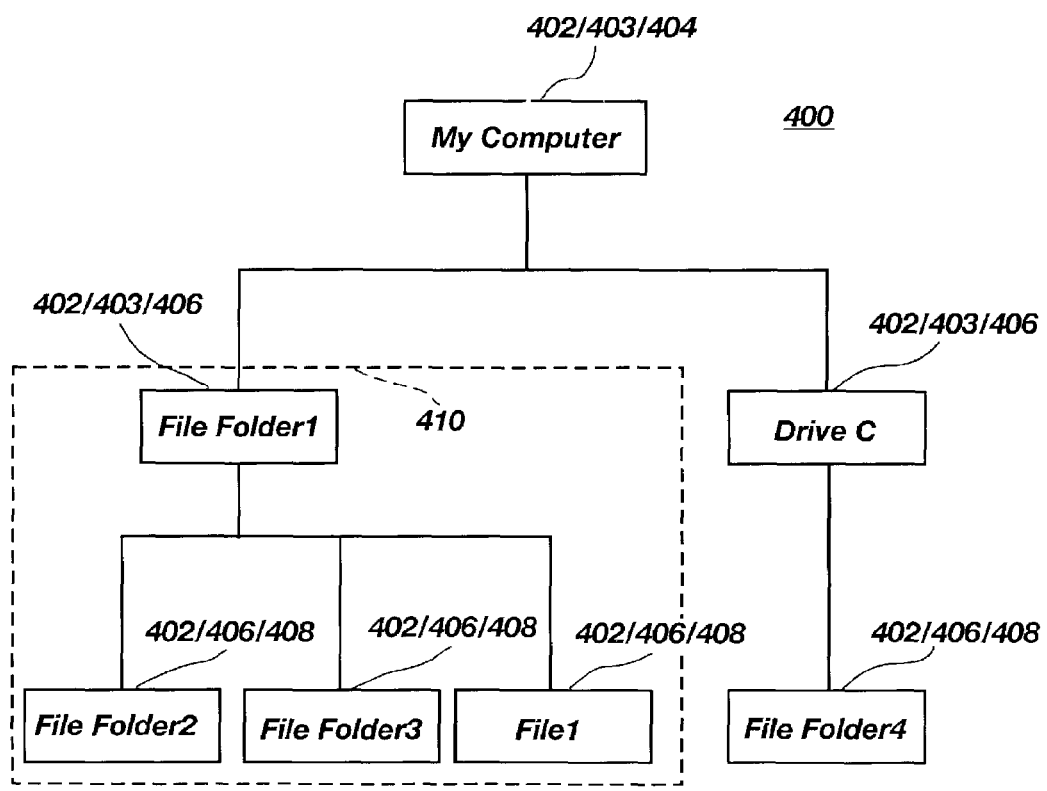
FIG. 4 is a hierarchical relationship diagram which may be modeled in certain embodiments of the present invention.

FIG. 4 illustrates a hierarchical relationship diagram. As mentioned above, a large number of components contained within, and related to, a computer environment are readily modeled and managed using a hierarchical structure such as a tree 400. Preferably, the tree 400 includes a plurality of nodes 402 organized according to a hierarchy. Typically, the hierarchy uses genealogical terms to refer to relationships between the nodes 402. A root node 404 begins the tree 400. A root node 404 is a node 402 which has no parent nodes 403. Descendants of a node 402 are child nodes 406. And child nodes 406 which have no children nodes 406 are leaf nodes 408. Nodes 402 of the same "generation" are siblings and are illustrated on the same horizontal level.

Preferably, each node 402 corresponds to a record 304 (See FIG. 3) in the database 302' (See FIG. 3). Throughout this specification, the terms "node" and "record" may be used interchangeably. Each record 304 represents an actual component in an actual computer environment. In FIG. 4, for example, the tree 400 may represent a file system of a single PC. The root 404 may do little more than hold a place, although the root 404 may include a name field such as "My Computer."

In an actual hierarchy of hardware/software components, components of different types may be included on the same level as siblings. For example, a computer file system may include file folder components, printer folder components, local disk components, and file components all on the same level. Modeling such a relationship using a relational database would require multiple tables. The additional tables require complex joins and queries of the database which cause delay when retrieving and updating data.

However, the present invention provides a database 302' (See FIG. 3) which stores records 304 in a hierarchical relationship that is substantially the same as the hierarchical relationship used for interaction and maintenance of actual components of a computer environment. For each type of record 304, a different object is defined in the database code 312 (See FIG. 3). In FIG. 4, the names on the nodes 402 indicate the type of database object that represents the node 402. Note that different types of nodes 402 are on the same horizontal level in the hierarchy.

Preferably, the relationships between the nodes 402 conform to traditional genealogical relationships with the exception that each node 402 has but one parent node 403. Generally, traditional genealogical relationships are preferred because that is how a majority of information for actual components of a computer environment is organized. Of course, the present invention may be implemented with relationships between nodes 402 being non-hierarchical as well. For example, child nodes 406 may have multiple parent nodes 403.

The preferred relationships between nodes 402 are illustrated by lines between the nodes 402. The relationships correspond to links 306 (See FIG. 3) within the database 302'. The links 306 may be implemented in a variety of ways. For example, in a preferred embodiment, each node 402 stores an indicator of its parent node 403 and indicators of any child nodes 406. Those of skill in the art recognize that the indicators may be pointers, addresses in memory, addresses within the database file 308 (See FIG. 3), or the like.

Figure 5:
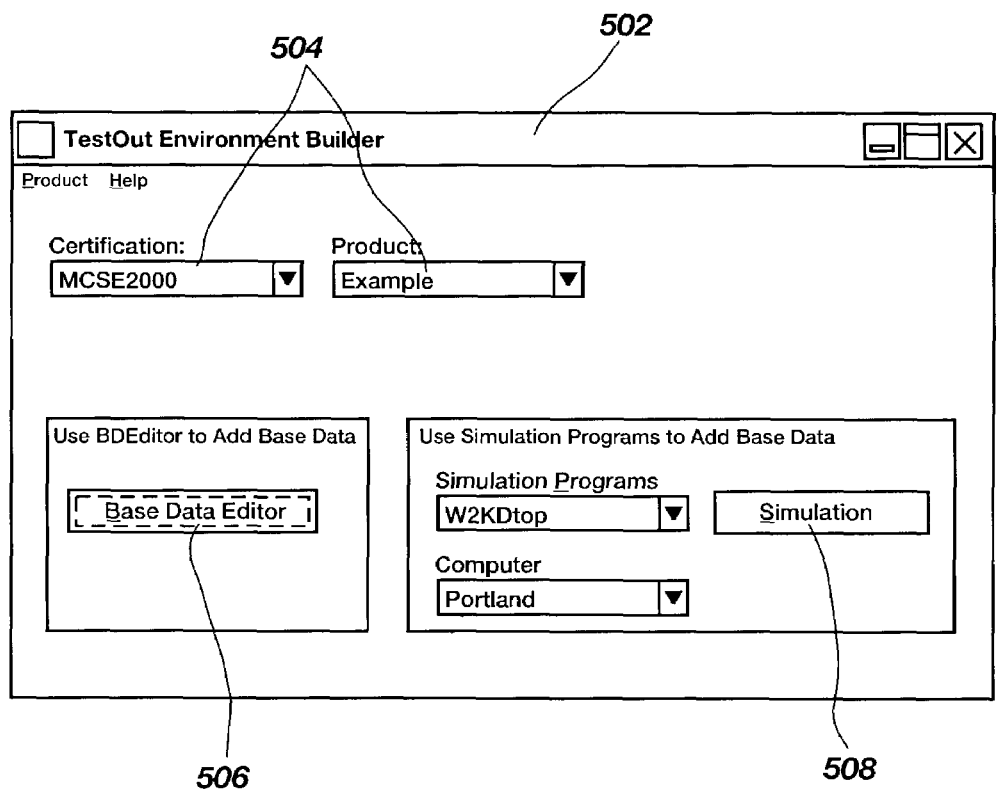
FIG. 5 is a user interface window according to one embodiment for editing base data.

The present invention includes tools for editing the data 108 of the database 302'. Preferably, the base data 120 is edited separately from the initial condition data 122 and simulation data 124. FIG. 5 illustrates a user interface window 502 for editing base data 120.

The interface window 502 may include buttons for editing the base data 120 in two different contexts. The window 502 may also include various other configuration controls 504 as well. Editor button 506 may launch a separate editor, discussed more below, for editing base data 120. Simulation button 508 may launch a simulation 102. Within the simulation 102, a user 112 (See FIG. 2) interacts with the simulators 106 (See FIG. 1) to define base data 120.

Figure 6:
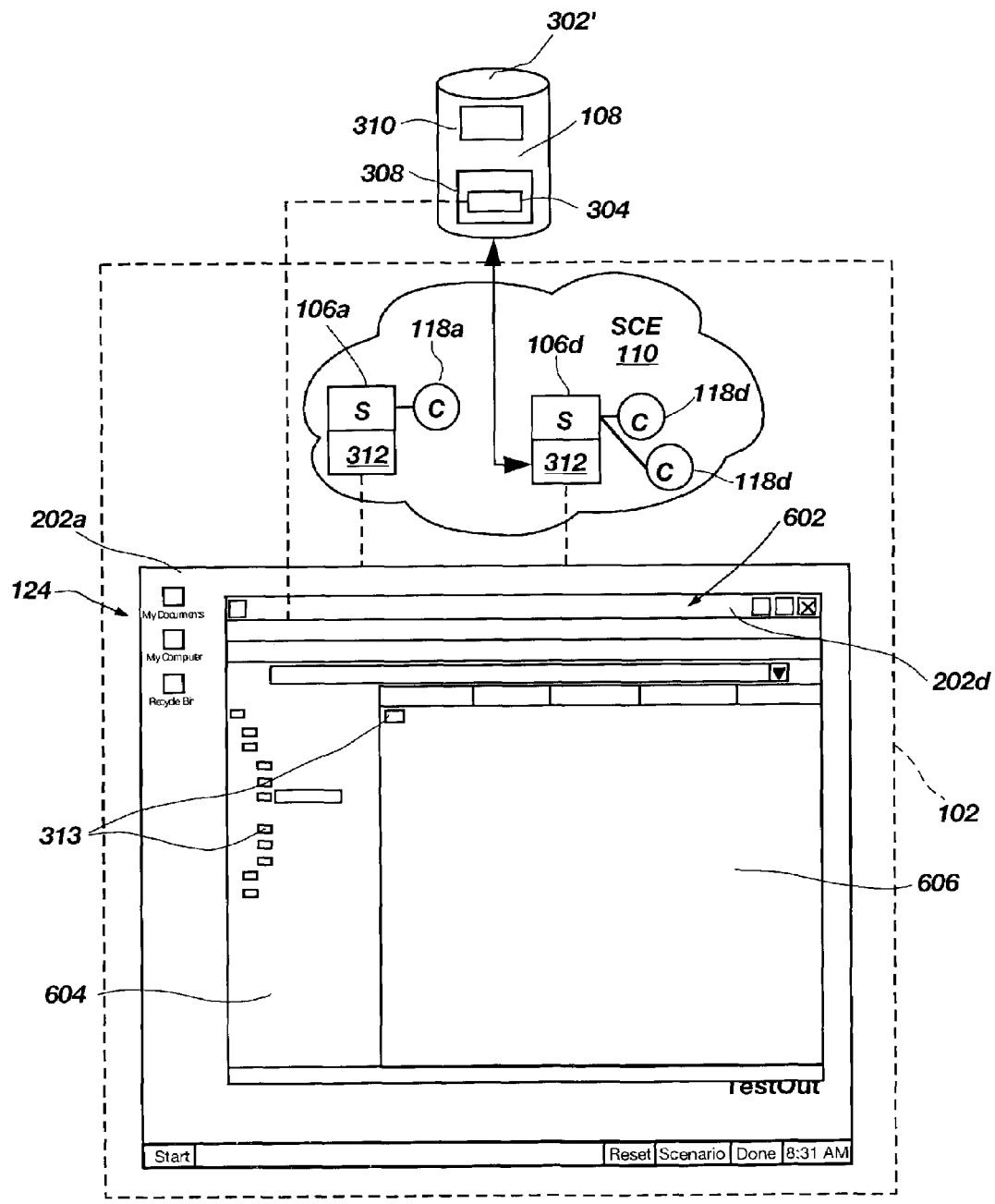
FIG. 6 is a block diagram illustrating editing of a database by interacting with a simulated computer environment.

Referring now to FIG. 6, when a user 112 activates simulation button 508. A simulation 102 is launched. Originally, the database 302' (See FIG. 3) may be empty and present simulators 106 having no defined components 118. Alternatively, the database 302' may include default components 118. In yet another alternative, an existing database 302' may be used, and data defining components 118 may be modified.

Within the interface 202a for a first simulator 106a, such as a simulator 106a for an operating system desktop, a user 112 may execute at least one additional simulator 106d with its associated user interface 202d. Preferably, the functionality for simulators 106 corresponds to that permitted in an actual computer environment such as a windows operating system. Thus, whichever additions, deletions, and modifications are permissible using actual administration tools in an actual computer environment are also available in the simulated computer environment 110.

The simulation 102 is presented in an "editing mode." Thus, tasks completed by a user 112 in the simulation 102 may not be recorded. As mentioned above, a temporary database 302' may be created. The simulation 102 itself is not edited, but the data, specifically base data 120 (See FIG. 1), for the simulation 102 is edited. The user 112 is free to add, delete, and modify data of the temporary database 302' using simulated administration tools 602. Once the user 112 exits the simulation 102, the temporary database 302' may be copied over the original database 302' (See FIG. 3) to create a new original database 302'.

One of the benefits in using a database 302', is that data entered into the database 302' can be tested to ensure it is of the proper type, size, format and the like. Tests which determine the proper characteristics for entered data are referred to as constraints. If improper data is entered, the constraints cause the data to be rejected before the data is stored in the database 302'. Constraints ensure that the database 302' is not corrupted with improper data. Constraints range from data type constraints to rule based constraints.

Preferably, data type constraints are enforced by the database code 312. Database code objects include attributes with associated data types. As an example, if a field has a data type constraint for a decimal number, attempts to enter a character would be prevented or rejected. The data type constraints generally correspond to the types of data in the actual components.

Rule based constraints are rules which govern the addition, deletion, or modification of data. The data may be for defining a field value, a record 304 (which generally defines a single simulated component 118), or an entire tree 400 (See FIG. 4). Preferably, most rule based constraints pertain to records 304 or nodes 402 of a tree 400. Certain rule based constraints are defined in the database code 312. These rule constraints are substantially the same as those enforced by actual graphical administration tools on actual components. By implementing the rule constraints in the database code 312, for example in database code objects, for records 304 which represent actual components, the simulated graphical administration tools 602 can enforce substantially the same constraints. As an example, rule based constraints may require that each leaf node 408 (See FIG. 4) is allowed to have only one parent node 403. Rule based constraints preserve a specific type of hierarchy for nodes 402 of the database 302,' such as a binary tree.

Referring still to FIG. 6, a simulator 106d represents a simulated graphical administration tool 602 by using the database 302'. As described in relation to FIG. 3, a hierarchy of simulated components 118d (only one is illustrated for simplicity) is presented in the simulation 102 to a user 112. The administration tool 602 includes a user interface 202d which presents the hierarchy of simulated components 118d.

The user interface 202d includes a hierarchy pane 604 and a detail pane 606. Generally, the hierarchy pane 604 is a treeview user interface control which includes the necessary functionality to display and collapse different levels of a hierarchical tree of data. The hierarchy pane 604 generally displays a hierarchy corresponding to a tree 400 (See FIG. 4) defined in the database 302'. Each record 304 corresponds to a simulated component 118d which emulates an actual component. As mentioned above, the records 304 generally include an icon field. The hierarchy pane 604 displays the icons 313 (See FIG. 3) of each record 304 to represent the actual component. A description may also be included.

The detail pane 606 provides substantially the same functionality as a detail pane of an actual administration tool being emulated. Generally, this means that for each selected record 304 in the hierarchy pane 604, the detail pane 606 lists any existing child nodes 406. For example, in FIG. 6, the simulated administration tool 602 is a windows explorer tool 602 for administering a file system of a computer. In the windows explorer tool 602, when a folder record 304 is selected, any existing child file records 406, for the folder record 304, are listed in the detail pane 606.

Of course, various other simulated administration tools 602 may present and allow modification of records 304 in a hierarchical tree 400. In a simulated computer environment 110 of a Windows® operating system, the windows device manager, system properties window, event viewer, computer management tool, and the like are but a few examples. The simulated administration tool 602 may or may not include a detail pane 606 depending on what functionality is provided in the actual administration tool.

Generally, actual administration tools allow details of actual components of a hierarchy, represented by a tree 400 (See FIG. 4), to be reviewed and edited by opening a "properties" window for the record 304. Of course, certain details may also be editable, or exclusively editable, from a detail pane 606. These details correspond to fields in a record 304 of the present invention. Therefore, to emulate an actual administration tool, the simulated administration tool 602 also provides a properties window (not shown) which allows editing of fields of a record 304. Alternatively, if a detail pane for an actual administration tool allows editing of properties, the detail pane 606 also allows one or more fields of a record 304 to be edited.

Figure 7A:
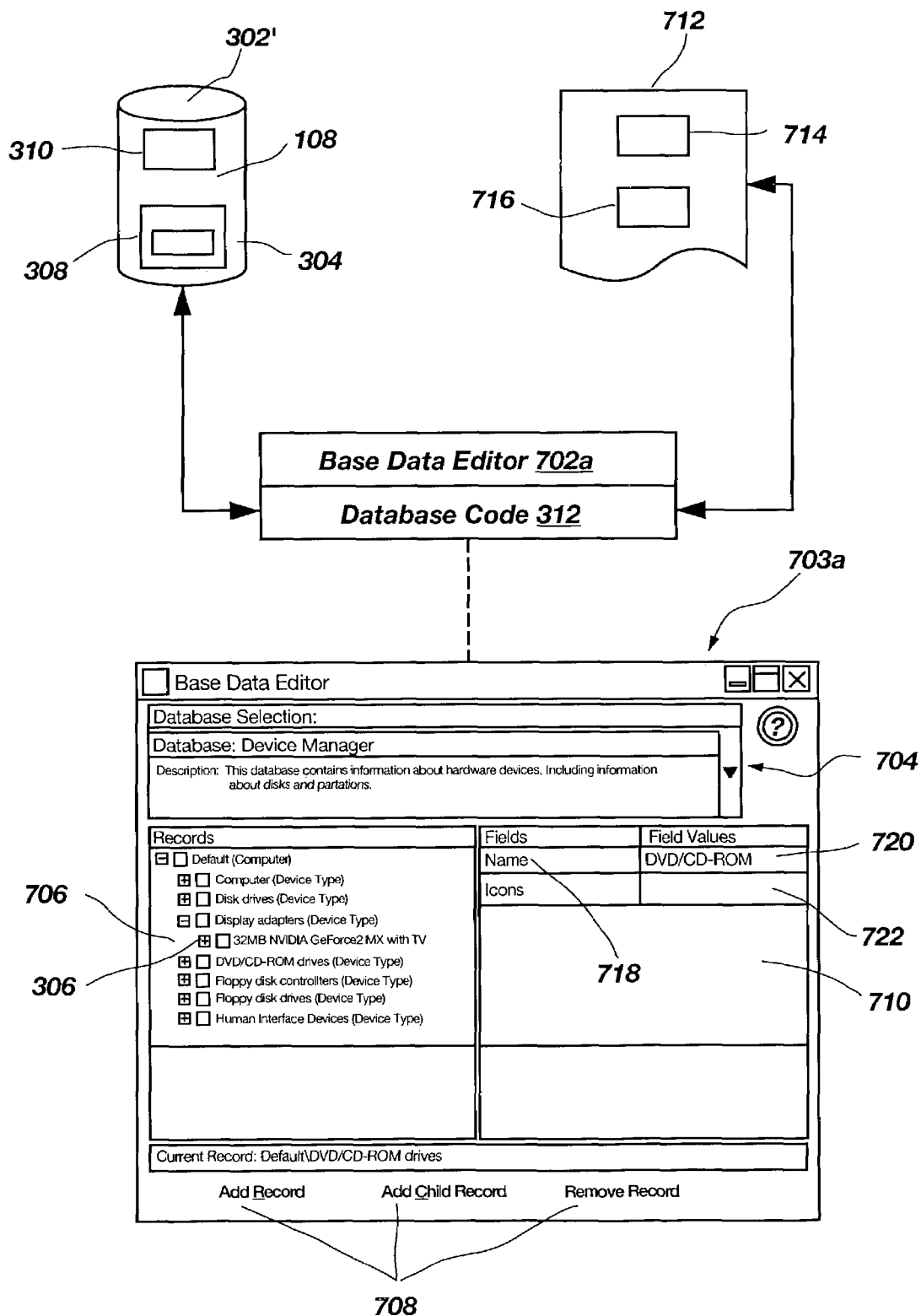
FIG. 7A is a block diagram illustrating one embodiment of a base data editor used to modify data in the database.

Referring now to FIG. 7A, if editor button 506 (See FIG. 5) is selected, a base data (BD) editor 702a is executed. The base data editor 702a includes a corresponding editor user interface 703a. A base data editor 702a is needed because constraints for actual administration tools may prevent additions, deletions, or modifications of certain data which is necessary to define simulated components 118 in a hypothetical simulated computer environment 110. Because the simulated administration tools 602 emulate actual administration tools, the simulated administration tools 602 enforce these same constraints.

FIG. 7A illustrates one embodiment of a base data editor 702a according to the present invention. Of course, editors for other databases 302' may be implemented in a similar manner to that described in relation to FIG. 7A. The base data 120 (See FIG. 1) is organized into various logical collections which may themselves be databases 302'. A drop-down selection box 704 allows a database 302' to be selected. The records 304 in the database 302' are displayed in the records pane 706.

Generally, the records pane 706 functions in a similar manner to the hierarchy pane 604 described in relation to FIG. 6. Therefore, the records 304 in the records pane 706 are presented visually using icons 313 (See FIG. 3) in a hierarchical tree 400 (See FIG. 4) structure. Preferably, the tree 400 structure correlates to the structure used in IT administration tools to review and add components to a computer system. Thus, exam test item writers familiar with the IT administration tools may readily use the base data editor 702a.

Records 304, both parent 403 and child 406, may be added or deleted in a selected database 302' by using menu items (not shown) or control buttons 708. Existing records 304 may be modified and new records populated with data through the detail pane 710. To allow modification of the database 302', the database code 312 is integrated with the base data editor 702a. Preferably, as discussed above, the database code 312 and the base data editor 702a are implemented using objects defined from classes.

To enforce constraints for a database 302', beyond those defined in the database code 312, a data schema 712 is loaded. Preferably, the data schema 712 is separate from the database 302'. Generally, the data schema 712 is only needed for editing the database 302'. Therefore, the data schema 712 is not distributed to general users of the simulation 102. This protects the security and integrity of the data 108 in the database 302'.

The data schema 712 includes a schema definition file 714 and schema index file 716. The schema index 716 is an index used by a simulator 106 in a database editor to access information within the definition file 714 quickly. The schema index 716 serves a similar function, and may be implemented in a similar manner to the database index 310.

The schema definition file 714 defines a schema for the database 302'. A schema defines rules for permissible structure of records 304 in the database 302', fields in the records 304, and links 306 between records 304. The definition file 714 defines the types of records 304 which may exist in a database 302'. The record types identify the number, size, and types of fields defined for a record 304. Link rules are also defined to identify which types of records 304 may be a parent and/or child record 304, for which other types of records 304. The link rules define a structure such that records 304 may be organized into a structure which models actual components of a computer system.

Use of the records pane 706 and detail pane 710 is intuitive and familiar to those of skill in the art who would use the editor 702a. Generally, users 112 are exam writers who are very familiar with IT technologies. The user 112 navigates the collapsible hierarchy to locate records 304 of interest.

The detail pane 710 displays specific field values for a record 304, or node 402, selected in the record pane 706. Preferably, the detail pane 710 presents the field values using a field description 718. Generally, the field description 718 is simply a descriptive name of the field.

The detail pane 710 also presents an edit control 720. Generally, the edit control 720 is a text box for entering plain text. The edit control 720 permits adding and changing of field values for a record 304. The field values may be values selected from drop-down lists, a free form text field value, a numeric field value, or the like. Preferably, the edit control 720 corresponds to the type of field in the record 304. For example, if the field is a date field, the edit control 720 is a calendar drop-down which allows a user 112 to select a desired date. Preferably, the detail pane 710 is dynamic, such that for each type of record 304 selected in the record pane 706, the detail pane 710 changes to display the appropriate set of field descriptions 718 and edit controls 720.

One example of an attribute for certain actual components which is generally not editable, is the icon used in a graphic operating system to represent the component. In FIG. 7A, a user 112 may edit the icon field 722 to set the icon corresponding to the record icon 313 (See FIG. 3). Of course, constraints may exist which limit the selection of icons made available to a user 112 for setting the record icon 313.

The base data editor 702a also allows a user 112 to modify the links 306 between records 304. Modifications of links 306 are governed by the link rules defined in the schema definition file 714, discussed above. In a rudimentary sense, the links 306 may be modified by deleting a record 304 and re-creating it at an appropriate level, and under a desired record 304. Preferably, a user 112 may select a record 304 in the records pane 706, drag the record 304 to a desired new location in the hierarchy, or tree 400, and drop the record 304 to change the link 306. Any child records 304, or child nodes 406, of the selected record 304 may remain linked to the selected record 304 and be repositioned at the new location.

Figure 7B:
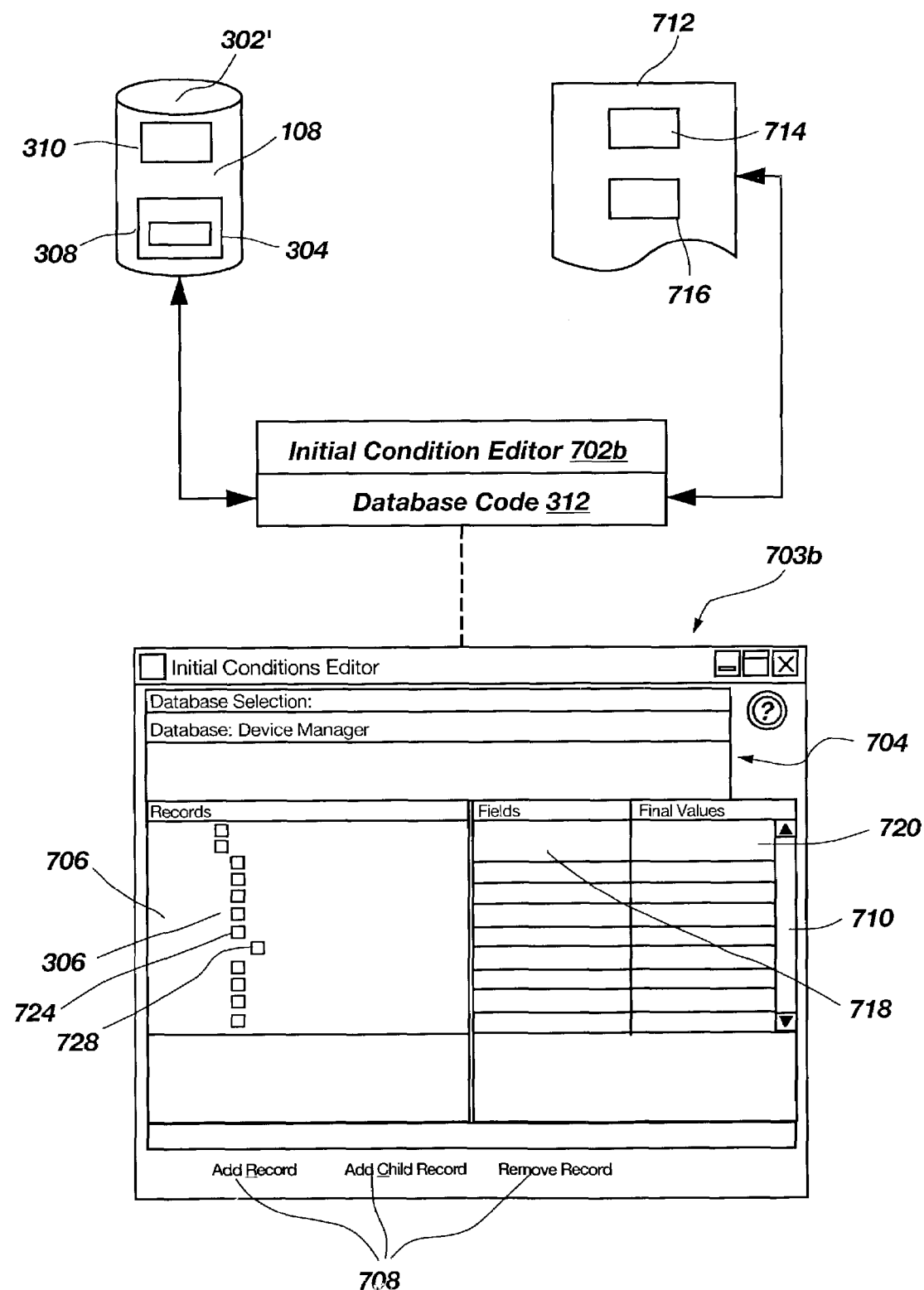
FIG. 7B is a block diagram illustrating one embodiment of an initial condition data editor used to modify initial condition data in the database.

Referring now to FIG. 7B, an initial condition editor 702b, may comprise substantially the same user interface 703b for defining initial condition data 122 (See FIG. 1) in an initial condition data database 302'. The data schema 712 is loaded, and records 304 may be modified in a manner similar to that described above. In addition, substantially the same database code 312 may be integrated with the initial condition editor 702b. In one embodiment, the initial condition editor 702b may load the base data 120, and provide visual indicators 724 to identify the base data records 304. Once a user 112 modifies the base data 120 in the initial condition editor 702b, the modifications may be stored as initial condition data 122, and the change may be visually highlighted with a different visual indicator 726. When a simulation 102 is executed, the modifications defined in initial condition data 122 are preferably applied to the base data 120 to present the simulation 102.

Figure 8:
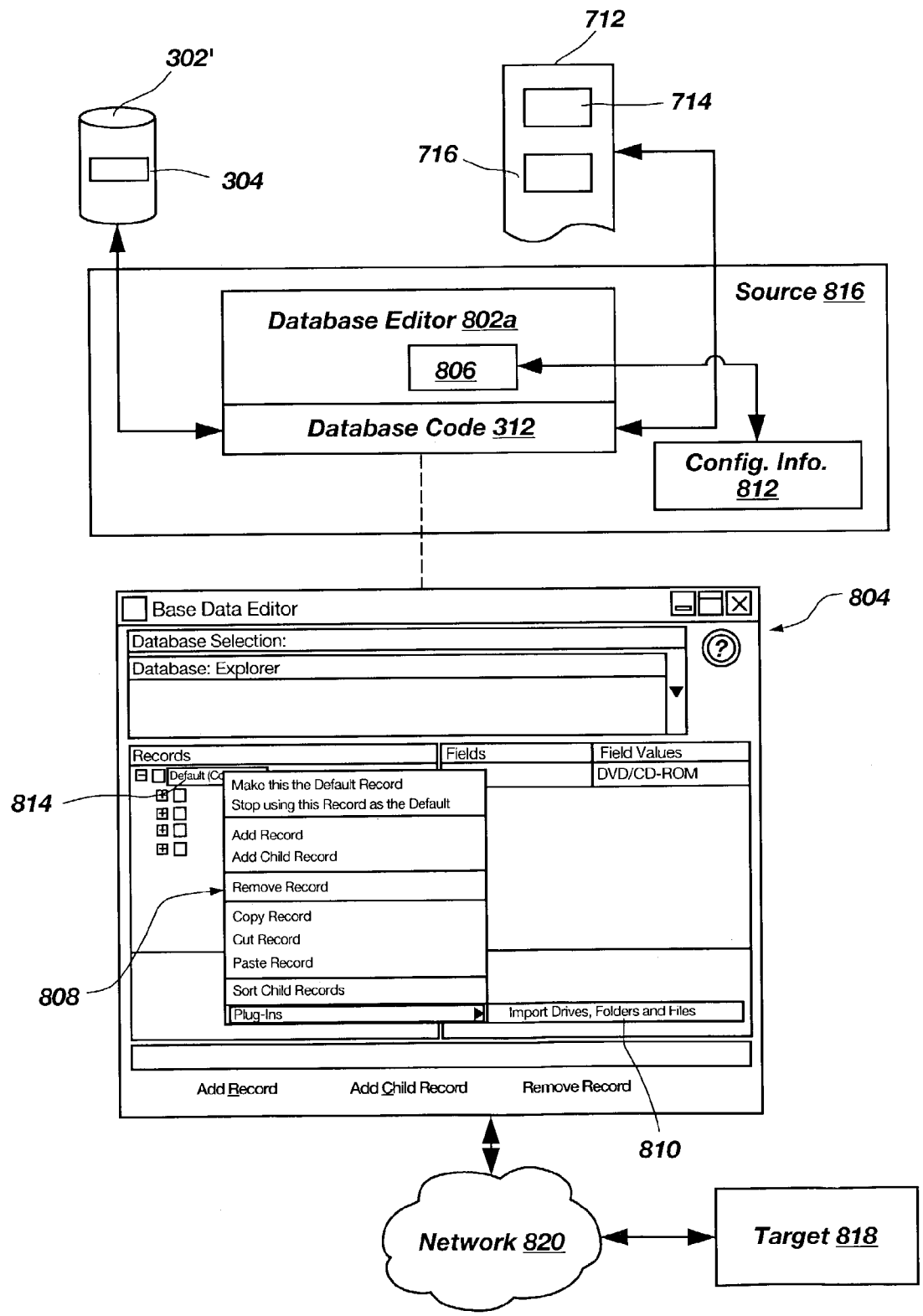
FIG. 8 is a block diagram illustrating one embodiment of a base data editor which includes an automatic record generator.

Referring now to FIG. 8, an alternative embodiment of a database editor 802 is illustrated. The database editor 802 is a more generic form of the editors 702a, 702b described in relation to FIGS. 7A and 7B. Preferably, the database editor 802 functions in similar manner to those described in relation to FIGS. 7A and 7B. Preferably, the database editor 802 is used to edit base data 120 in a base data database 302', and includes the familiar user interface 804.

Preferably, the database editor 802 is integrated with an automatic record generator 806. The automatic record generator 806 is a software module programmed to automatically generate records 304 for the database 302' in response to a user-initiated request. Generally, the automatic record generator 806 is implemented as a software object which may readily communicate with the database editor 802 and database code 312. Alternatively, the automatic record generator 806 may be a plug-in module which may be associated with the database editor 802. In yet another alternative, the automatic record generator 806 may be a stand-alone application which communicates with the database editor 802.

The automatic record generator 806 operates in response to a user-initiated request. Generally, this request is made through a menu selection on a main menu (not shown) or pop-up menu 808 of the database editor 802. The request may identify the automatic record generator 806 by the type of records 304 which the automatic record generator 806 is programmed to generate. For example, in FIG. 8 the menu item 810 reads: "Import Drives, Folders, and Files," which indicates that the automatic record generator 806 will generate records 304 of various types defined in a file system of a computer.

Once the automatic record generator 806 is initiated, the automatic record generator 806 automatically detects configuration information 812. As referenced herein, the term "automatically" is defined as not requiring user intervention, notification, or involvement.

The configuration information 812 is used to automatically generate records 304 corresponding to actual components defined by the configuration information 812.

Alternatively, the detection and generation operations may be semi-interactive. For example, if access to certain configuration information 812 is password protected, the user 112 (See FIG. 1) may be prompted to provide the necessary password to permit access.

Configuration information 812 is any information needed to generate a record 304 in a database 302' used to present simulations 102. Configuration information 812 is actual data for a computer system which defines actual components of the computer system. How configuration information 812 is detected depends on the types of records 304 the user 112 wishes to have automatically generated. In the example of FIG. 8, generation of records 304 to represent a file system may require the automatic record generator 806 to scan a hard drive and/or an operating system registry of an actual computer system to identify the files, folders, and drives.

From detected configuration information 812, records 304 are generated and links 306 (See FIG. 3) are defined corresponding to the hierarchical relationship of the actual components defined in the configuration information 812. The generated records 304 are then stored in the database 302'. If a tree 400 (See FIG. 4) of records 304 is generated, the tree 400 may be stored separate from other trees 400 in the database 302'. Alternatively, based on which record 304 is selected in the records pane 706, the tree 400 may be added as a sub-tree 410 (See FIG. 4) to the selected record 814.

In certain embodiments, a plurality of automatic record generators 806 may be provided in the database editor 802. Each record generator 806 may generate particular types of records 304 and/or hierarchical trees 400. Examples of automatic record generators 806 include an automatic record generator 806 for generating network protocol records 304, registry settings records 304, records 304 defining services for the operating system, and the like. With a plurality of automatic record generators 806 integrated in a database editor 802, the set of automatic record generators 806 presented to a user 112 may depend on the context. For example, if a user 112 selects a "computer" record 304, a different set of automatic record generators 806 may be presented than if the user selects a folder record 304.

Generally, the automatic record generator 806 gathers the configuration information 812 from an actual computer system executing the database editor 802. The computer system executing the database editor 802 may be referred to as the source computer system 816. The automatic record generator 806 allows a user 112 to quickly generate records 304 which provide a very realistic simulated computer environment 110. Alternatively, each record 304 could be defined manually by the user 112. The realism is enhanced because the records 304 are substantially the same as information in the source computer system 816.

In certain embodiments, the automatic record generator 806 may operate by detecting configuration information 812 of a target computer system 818. The target computer system 818 may be in communication with the source computer system 816 via a network 820. Alternatively, the source computer system 816 may be directly connected to the target system 818.

In this embodiment, the automatic record generator 806 operates just as though configuration information 812 is being detected on the source computer system 816. A user 112 initiates a request to have records 304 automatically generated. A user 112 may also be required to identify the target system 818 from a list of computer systems which are in communication with the source computer system 816. The automatic record generator 806 operates on the source computer 816, and detection operations are completed remotely on the target computer system 818. The automatic record generator 806 then generates and stores the appropriate records 304 in the database 302'.

Figure 9:
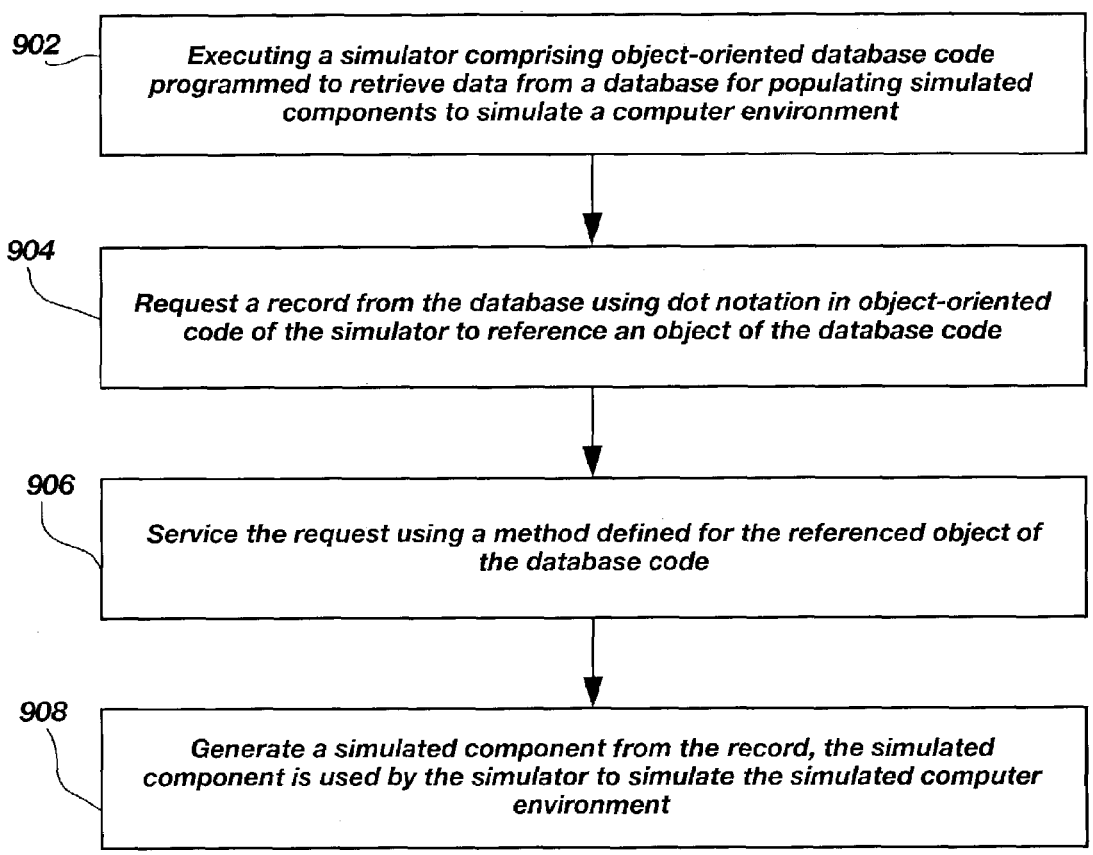
FIG. 9 is a flowchart of a method for providing data in a simulated computer environment.

FIG. 9 illustrates a flowchart of a method 900 for providing data 108 (See FIG. 1) in a simulated computer environment 110. The method 900 begins by executing 902 a simulator 106 (See FIG. 1) comprising object-oriented database code 312 (See FIG. 3) programmed to retrieve data from a database 302' (See FIG. 3) for populating simulated components 118 to simulate the computer environment 110. A record 304 is requested 904 from the database 302' using dot notation in object-oriented code of the simulator 106 to reference an object of the database code 312. The request is serviced 906 using a method defined for the referenced object of the database code 312. Finally, a simulated component 118 is generated 908 from the record 304. The simulated component 118 is used by the simulator 106 to simulate the simulated computer environment 110.

Figure 10:
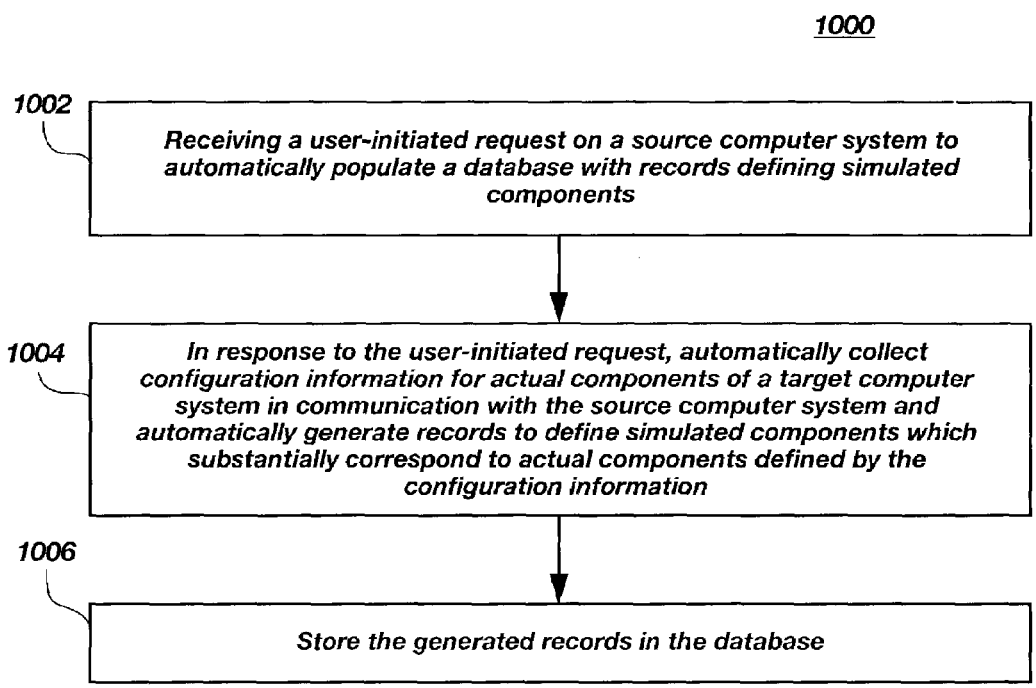
FIG. 10 is a flowchart of a method for populating a database used to present a simulated computer environment.

FIG. 10 illustrates a flowchart of a method 1000 for populating a database 302' to define simulated components 118 in a simulated computer environment 110. The method 1000 begins by receiving 1002 a user-initiated request on a source computer system 816 (See FIG. 8) to automatically populate a database 302' (See FIG. 3) with records 304 defining simulated components 118. In response to the user-initiated request, configuration information 812 is automatically collected 1004 for actual components of a target computer system 818 in communication with the source computer system 816. In addition, records 304 are automatically generated to define simulated components 118 which substantially correspond to actual components defined by the configuration information 812. Finally, the generated records 304 are stored 1006 in the database 302'. In certain embodiments the source computer 816 and target computer 818 are the same computer system.

Based on the foregoing, the present invention offers a number of advantages not available in conventional approaches. The present invention provides data from a database for realistic simulations 102 without noticeable delays. In addition, there are no database drivers or database configuration settings to configure for deployment of the present invention. Simulators 106 of the present invention are provided direct access to the data in the database without an intermediate database level such as SQL. The present invention provides a hierarchical database structure which more closely corresponds to components in IT technology. The present invention also provides for automatic generation of records 304 for a database 302'.

While specific embodiments and applications of the present invention have been illustrated and described, it is to be understood that the invention is not limited to the precise configuration and components disclosed herein. Various modifications, changes, and variations apparent to those skilled in the art may be made in the arrangement, operation, and details of the methods and systems of the present invention disclosed herein without departing from the spirit and scope of the invention.

It is to be understood that the above-referenced arrangements are illustrative of the application for the principles of the present invention. Numerous modifications and alternative arrangements can be devised without departing from the spirit and scope of the present invention while the present invention has been shown in the drawings and described above in connection with the exemplary embodiments(s) of the invention. It will be apparent to those of ordinary skill in the art that numerous modifications can be made without departing from the principles and concepts of the invention as set forth in the claims.

What is claimed is:

1. A hierarchical database management system which provides data to populate a simulated computer environment, the data being organized according to a data schema that defines different types of records in the database, the system comprising:
    a database comprising records which define simulated components in the simulated computer environment, wherein the simulated component represents one of a hardware component and a user interface control component representing an actual computer environment, the database further comprising links which define hierarchical relationships between the simulated components, wherein at least one simulated component is configured to interact with another simulator and provide functionality which does not require a user interface and at least one simulated component is a simulated user interface that simulates a user interface of the simulated computer environment;
    a database code programmed to add, delete, modify, and retrieve records representing the simulated components and links of the database;
    a software simulation engine for maintaining and generating the simulated computer environment using the defined simulation components and hierarchical relationships in the database to enable a user to perform tasks within the simulated computer environment through the simulated user interface; and
    wherein the database code is integrated with the software simulation engine and the software simulation engine comprises simulation code programmed to generate the simulated computer environment and populate simulated components within the simulated computer environment based on records retrieved using the database code.

2. The system of claim 1, wherein the simulated computer environment comprises a simulated graphical administration tool that presents simulated components of the simulated computer environment in a hierarchy defined by records in the database, the hierarchy being substantially the same as a hierarchy of actual components in an actual computer system.

3. The system of claim 2, wherein the records comprise icons which are substantially the same as icons which are associated with actual components of an actual computer system.

4. The system of claim 2, wherein the simulated graphical administration tool utilizes the database code to enforce substantially the same constraints for simulated components in the hierarchy as constraints defined for an actual graphical administration tool, the constraints governing addition, deletion, and modification of actual components.

5. The system of claim 2, wherein the simulated graphical administration tool comprises a user interface comprising a hierarchy pane which graphically displays records of the database and relationships between the records and a detail pane.

6. The system of claim 5, wherein the detail pane displays at least one record having a child relationship with a selected record in the hierarchy pane.

7. The system of claim 1, wherein the database code is integrated with the software simulation engine and the software simulation engine comprises a database editor which loads the data schema and edits the records and links stored in the database using the database code.

8. The system of claim 7, wherein the database editor comprises an initial condition editor which loads the data schema and records modifications to the records stored in the database using the database code, the modifications being applied to records of the database which define a simulation.

9. The system of claim 7, wherein the database editor executes on a computer system and the system further comprises:
    in response to a user request, an automatic record generator in communication with the database editor automatically detects configuration information for the computer system executing the database editor; and
    wherein the automatic record generator generates records based on the detected configuration information and stores the generated records in the database.

10. The system of claim 9, wherein a plurality of automatic record generators exist and the system selects the automatic record generator presented to a user based on context.

11. The system of claim 8, wherein the database editor includes a user interface comprising:
    a hierarchy pane which graphically displays records of the database and relationships between the records; and
    a record detail pane which displays fields and field values for a selected record in the hierarchy pane.

12. The system of claim 1, wherein the data schema comprises a schema definition file and a schema index file.

13. The system of claim 1, wherein a record comprises an icon field which defines an icon for representing the record graphically.

14. A computer-readable storage medium containing instructions for implementing a hierarchical database management system which provides data for a simulated computer environment, wherein the computer-readable storage medium comprises:
    computer readable instructions for causing a computer to define a database comprising records which define simulated components in the simulated computer environment, wherein the simulated component represents one of a hardware component and a user interface control component representing an actual computer environment, the database further comprising and links which define hierarchical relationships between the records, wherein at least one simulated component is configured to interact with another simulator and provide functionality which does not require a user interface and at least one simulated component is a simulated user interface that simulates a user interface of the simulated computer environment;

computer readable instruction for causing the computer to manage records and links of the database; and computer readable instructions for causing the computer to generate the simulated computer environment and to generate-simulated components in the simulated computer environment based on records supplied from the database to enable a user to perform tasks within the simulated computer environment through the simulated user interface.

* * * * *